(12) United States Patent
Zack et al.

(10) Patent No.: US 11,672,267 B2
(45) Date of Patent: Jun. 13, 2023

(54) ADDITIVES AND USE THEREOF IN CORN FERMENTATION PROCESS STREAMS AND OTHER BIOPROCESSES

(71) Applicant: BASF SE, Ludwigshafen am Rhein (DE)

(72) Inventors: Kenneth L. Zack, Wyandotte, MI (US); Joseph P. Borst, Wyandotte, MI (US); Yaser Shirazi, Wyandotte, MI (US); Padma P. Varanasi, Wyandotte, MI (US); Matthew Gerard Lyon, Wyandotte, MI (US)

(73) Assignee: BASF SE, Ludwigshafen am Rhein (DE)

( * ) Notice: Subject to any disclaimer, the term of this patent is extended or adjusted under 35 U.S.C. 154(b) by 554 days.

(21) Appl. No.: 16/675,755

(22) Filed: Nov. 6, 2019

(65) Prior Publication Data

US 2020/0138073 A1 May 7, 2020

Related U.S. Application Data

(60) Provisional application No. 62/756,396, filed on Nov. 6, 2018.

(51) Int. Cl.
| | | |
|---|---|---|
| *A23L 29/00* | (2016.01) | |
| *C12C 5/02* | (2006.01) | |
| *C12F 3/10* | (2006.01) | |
| *A23L 29/30* | (2016.01) | |
| *A23L 33/115* | (2016.01) | |
| *A23D 9/02* | (2006.01) | |
| *A23L 33/185* | (2016.01) | |

(52) U.S. Cl.
CPC .............. *A23L 29/035* (2016.08); *A23D 9/02* (2013.01); *A23L 29/055* (2016.08); *A23L 29/30* (2016.08); *A23L 33/115* (2016.08); *A23L 33/185* (2016.08); *C12C 5/02* (2013.01); *C12F 3/10* (2013.01); *A23V 2002/00* (2013.01)

(58) Field of Classification Search
CPC ...... A23L 29/055; A23L 29/30; A23L 33/115; A23L 33/185; A23D 9/02; C12C 5/02; C12F 3/10; A23V 2002/00
USPC ......... 426/592, 601, 615, 74, 618, 423, 478, 426/493
See application file for complete search history.

(56) References Cited

U.S. PATENT DOCUMENTS 9,255,239 B1 * 2/2016 Wiese
2005/0008022 A1 * 1/2005 McClung et al.

FOREIGN PATENT DOCUMENTS

WO  WO 2017/223063   * 12/2017

* cited by examiner

*Primary Examiner* — Helen F Heggestad
(74) *Attorney, Agent, or Firm* — Armstrong Teasdale LLP

(57) ABSTRACT

The present disclosure provides compositions and methods for enhancing oil recovery and protein recovery from a product from a corn fermentation process stream, such as corn syrup. Compositions generally include a product from a corn fermentation stream and an additive including at least one alkylphenol ethoxylate formaldehyde resin, at least one sodium alkyl sulfate, or a blend of at least one anionic surfactant with at least one non-ionic surfactant in a weight ratio of the at least one nonionic surfactant to the at least one anionic surfactant in a range from about 1:20 to about 20:1. Methods combine such an additive with the product from a corn fermentation stream to produce a mixture which is preferably heated and centrifuged to separate oil and protein from the product.

14 Claims, 4 Drawing Sheets

ADDITIVES AND USE THEREOF IN CORN FERMENTATION PROCESS STREAMS AND OTHER BIOPROCESSES

CROSS-REFERENCES

This application claims the benefit under 35 U.S.C. § 119 of U.S. Provisional Application No. 62/756,396, filed Nov. 6, 2018, and entitled ADDITIVES TO IMPROVE REMOVAL OF OIL FROM STILLAGE AND OTHER BIOPROCESSES, the entire contents of which are hereby incorporated by reference.

FIELD OF THE INVENTION

The present invention relates to improved processing of coproducts from corn to ethanol production and more particularly, for increasing the recovery of corn oil and other coproducts from a corn fermentation process stream.

BACKGROUND

Corn bioethanol producers derive value from their crops in a variety of ways. The ethanol produced from corn is the major source of income, but other revenue streams exist. For example, other products or coproducts of ethanol production, such as dried distiller's grains and corn oil, are produced. A major market for distiller's corn oil is feed and fuel production, such as biodiesel production. Animal feed can be prepared from dried distiller's grains with solubles (DDGS).

In the production of ethanol, after fermentation, a beer is formed. The beer is distilled and ethanol is collected. The remainder of the beer is called whole stillage and contains water, protein, nutrients, fiber and corn oil. The whole stillage is centrifuged to produce wet cake and thin stillage containing water and dissolved solids. Water from the thin stillage is evaporated and a corn syrup is formed. Generally, corn syrup is comprised of protein, fat/oil, and carbohydrates (cellulose, starch) in a water media. During the process of corn oil extraction, corn syrup is centrifuged and the oil is removed and separated from the distiller's grains. Oil yield or production during the extraction process can be increased by temperature and the use of surfactants, such as ethoxylated sorbitan fatty acid esters and related ethoxylated sorbitan esters, to treat the syrup. However, there is still a significant amount of corn oil that is not extracted and remains in the syrup. Oil droplets can be at different interfaces, including free oil, bound oil and/or trapped oil. Free oil includes oil droplets that are dispersed in the continuous phase (water). Co-surfactants exist in the syrup (i.e., monoglycerides and diglycerides) that prevent oil coalescence. Bound oil includes oil that is bound to surfaces, such as proteins and fibers. Trapped oil includes oil that is surrounded by solid particles having hydrophilic and/or hydrophobic surfaces.

Separating protein from the corn syrup can be difficult. In the protein separation process, any protein bound to particles or oil will likely not be removed. In the case of protein bound to oil, the oil/protein complex will have a lower density and tend to reside in or near the upper oil phase. In the case of protein bound to solid particles, for example, fiber, the protein will reside in the lower solid phase.

If the extract yields for corn oil could be increased, additional revenue could be generated. Free fatty acids, color, odor, and waxes are limiting factors to biodiesel producer's usage of corn oil. An increase in the clarity and/or a decrease in the turbidity of distiller's corn oil yields a higher value for the corn oil. A higher quality corn oil material could also be used in oleo chemical and food-grade opportunities.

What is needed are improved methods and compositions for extracting greater amounts of corn oil and maximizing overall production and quality of coproducts of corn to ethanol production. What is further needed are methods and compositions for obtaining corn oil with increased clarity and/or decreased turbidity from such production. What is still further needed are methods for forming such compositions.

SUMMARY OF THE DISCLOSURE

The present disclosure overcomes the problems inherent in the art and provides additives and methods of using such additives to increase the yield and clarity of corn oil and other coproducts produced during ethanol production.

In one aspect of the present disclosure, a composition comprising a product from a corn fermentation process stream and at least one additive comprising alkylphenol ethoxylate formaldehyde resins or sodium alkyl sulfate, is provided.

In another aspect of the present disclosure, a composition comprising a product from a corn fermentation process stream and an additive, wherein the additive comprises a blend of at least one anionic surfactant and at least one nonionic surfactant, and wherein the weight ratio of the at least one nonionic surfactant to the at least one anionic surfactant is in a range from about 1:20 to about 20:1, is provided.

In another aspect of the disclosure, a method of increasing the amount of corn oil recovered from a product from a corn fermentation process stream is provided. In general, the method comprises the steps of contacting the product from a corn fermentation process stream with an additive selected from the group of alkylphenol ethoxylate formaldehyde resins, a blend of at least one anionic surfactant with at least one nonionic surfactant having a weight ratio of the at least one nonionic surfactant to the at least one anionic surfactant in a range from about 1:20 to about 20:1, a blend of at least one alkylphenol ethoxylate formaldehyde resin and at least one anionic surfactant, a blend of at least one alkylphenol ethoxylate formaldehyde resin and at least one other nonionic resin and any combination thereof to produce a mixture; centrifuging the mixture; and recovering corn oil from the mixture, wherein the amount of corn oil recovered is greater than the amount of corn oil that would be recovered using the same process without inclusion of the additive.

In another aspect of the disclosure, a method of increasing the amount of protein separated and recovered in a coproduct from a product from a corn fermentation process stream is provided. In general, the method comprises the steps of contacting the product from a corn fermentation process stream with at least one additive selected from the group of alkylphenol ethoxylate formaldehyde resins, sodium alkyl sulfate, a blend of at least one anionic surfactant with at least one nonionic surfactant having a weight ratio of the at least one nonionic surfactant to the at least one anionic surfactant in a range from about 1:20 to about 20:1, a blend of at least one alkylphenol ethoxylate formaldehyde resin and at least one anionic surfactant, a blend of sodium alkyl sulfate and at least one nonionic surfactant, at least one nonionic surfactant, and any combinations thereof, to produce a mixture; separating protein from the mixture and recovering a coproduct comprising the protein, wherein the amount of protein recovered in the coproduct is greater than the amount of protein that would be recovered using the same process without inclusion of the additive.

The various aspects of the disclosure provide improved additives and methods for recovering corn fermentation coproducts from a corn to ethanol process at lower costs.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

DETAILED DESCRIPTION

Figure 1:
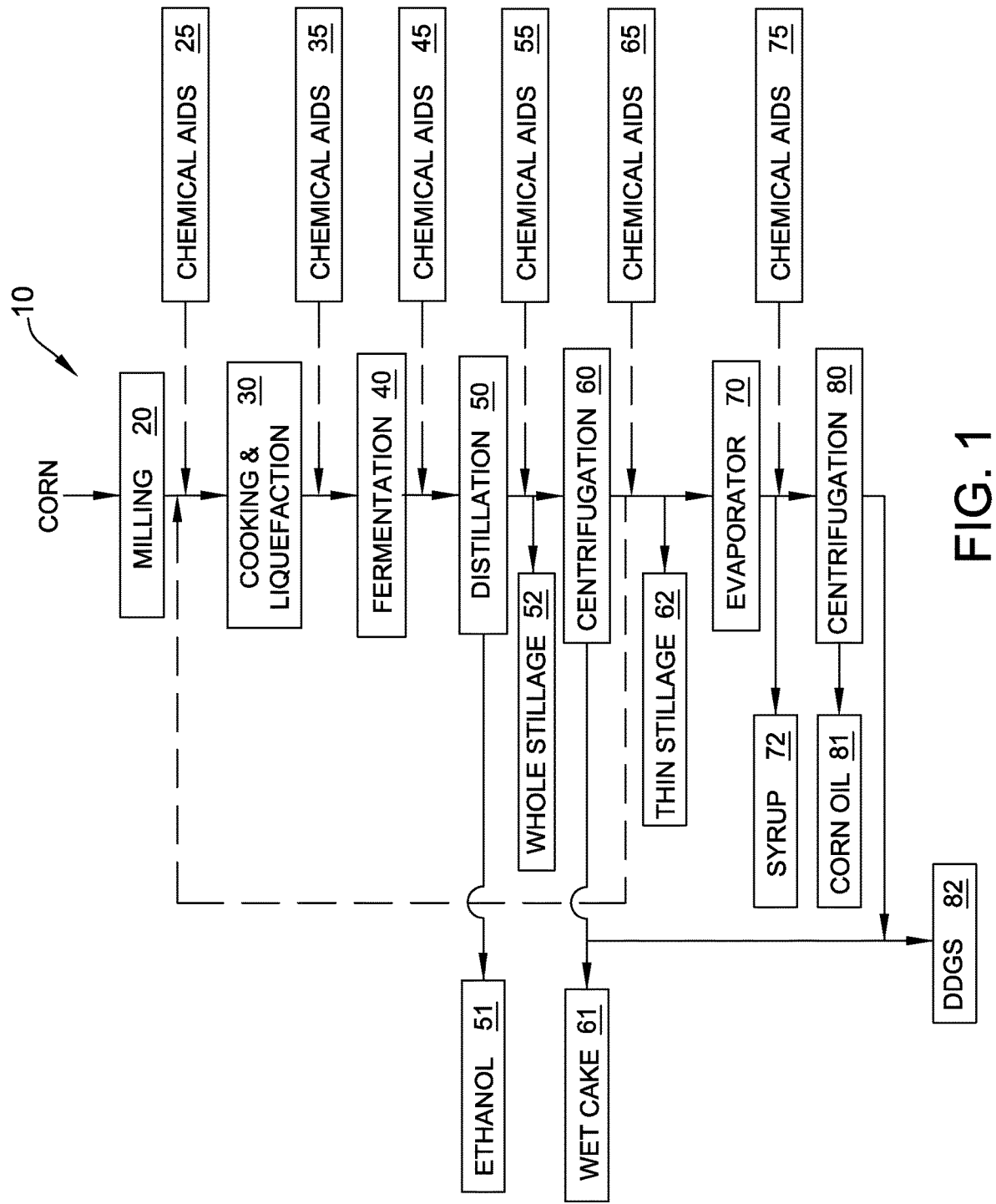
FIG. 1 is a schematic drawing of the bioethanol production process illustrating that the surfactants and surfactant mixtures of the disclosure can be used at any point of the production process to separate oil from the water and solids.

The following detailed description and examples set forth preferred materials and procedures used in accordance with the present disclosure. It is to be understood, however, that this description and these examples are provided by way of illustration only, and nothing therein shall be deemed to be a limitation upon the overall scope of the present disclosure.

The singular forms "a", "an" and "the" include plural referents unless the context clearly dictates otherwise. The endpoints of all ranges reciting the same characteristic are independently combinable and inclusive of the recited endpoint. All references are incorporated herein by reference.

The modifier "about" used in connection with a quantity is inclusive of the stated value and has the meaning dictated by the context (e.g., includes the tolerance ranges associated with measurement of the particular quantity).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

Unless noted otherwise, all concentrations refer to the active content of the surfactant.

The various aspects of the disclosure provide improved additives and methods for recovering corn fermentation coproducts at higher yields, enhanced quality and lower costs from a corn to ethanol process. In one aspect, higher amounts of corn oil with good clarity are separated from the process stream. In another aspect, higher amounts of protein are isolated from the corn to ethanol process stream and a higher value corn fermentation coproduct, such as distilled grains solids with solubles can be obtained.

In one aspect of the present disclosure, a composition comprising a product from a corn fermentation process stream and at least one additive comprising alkylphenol ethoxylate formaldehyde resins or sodium alkyl sulfate is provided.

In a corn fermentation process, products, such as ethanol, are produced. A product from a corn fermentation process stream can be any product from a corn fermentation process stream, such as that schematically shown in FIG. 1. The dry-grind process, 10, begins with milling or grinding corn kernels, 20, into a meal, which is mixed with water and enzymes. The starch-containing material is degraded into fermentable sugars by a cooking and liquefaction process, 30. During fermentation, 40, the sugars are converted into a fermented mash or beer. Liquid fermentation products, such as ethanol, 51, are recovered from the beer by distillation, 50. The remaining fraction is referred to as whole stillage, 52, and contains water, protein, nutrients, fiber and corn oil. The whole stillage, 52, is dewatered and separated into a solid phase, referred to as wet cake, 61, and a liquid phase, referred to as thin stillage, 62, by centrifugation or screening, 60. Dewatered wet cake is dried to provide "Distillers Dried Grain" (DDG) (not shown), which may be used as a nutrient in animal feed. The thin stillage, 62, may be recycled to the meal mixture or may be concentrated by evaporation, 70, into a syrup, 72. The syrup, 72, may be centrifuged, 80, to separate corn oil, 81, and the remainder may be added to the wet cake, 61, before drying to produce Distillers Dried Grain with Solubles (DDGS), 82.

In one aspect, a product can be any product from a corn fermentation process stream or bioethanol process including, but not limited to, meal (after the corn has been milled), beer, stillage, such as whole stillage or thin stillage, wet cake (distillers wet grain), distillers dried grain, distillers dried grain with solubles and corn syrup. In one aspect, the product from a corn fermentation process stream is corn syrup. In another aspect, the product from a corn fermentation process stream is whole stillage or thin stillage. In another aspect, the product is beer.

In one aspect, the at least one additive comprises an alkylphenol ethoxylate formaldehyde resin. Alkylphenol ethoxylate formaldehyde resins can improve the yield of coproducts, such as corn oil. In some forms, the alkylphenol ethoxylate formaldehyde resin is a butylphenol ethoxylate formaldehyde resin, amylphenol ethoxylate formaldehyde resin, octylphenol ethoxylate formaldehyde resin, or nonylphenol ethoxylate formaldehyde resin. In another aspect, the alkylphenol ethoxylate formaldehyde resin is a nonylphenol ethoxylate formaldehyde resin or an amylphenol ethoxylate formaldehyde resin. In one aspect, the alkylphenol ethoxylate formaldehyde resins include, but are not limited to the BASOROL® products (BASF Corporation) including BASOROL® P DB-9942, BASOROL® P DB-9945, BASOROL® P DB-9946, BASOROL® P DB-9954A, BASOROL® P DB-9429, BASOROL® P DB-9954, BASOROL® P DB-9947, BASOROL® P DB-9955, BASOROL® P DB-9934, BASOROL® P DB-9958, BASOROL® P DB-9935, and any combination thereof.

In one aspect, the at least one additive comprises sodium alkyl sulfate. The inventors discovered that sodium alkyl sulfate improved protein isolation from a corn fermentation stream and that distillers dried grain with solubles having higher amounts of protein could be recovered. Without being bound by theory, it is believed that the sodium alkyl sulfate interacts with positively charged regions on protein molecules to desorb the proteins from oil-water interfaces and move them into the aqueous phase. In one aspect, the alkyl group may comprise $C_5$-$C_{20}$ alkyl groups. In another aspect, the alkyl group may be pentyl, hexyl, heptyl, octyl, nonyl, decyl, undecyl, dodecyl or lauryl, $C_{13}$ alkyl, $C_{14}$ alkyl, $C_{15}$ alkyl, $C_{16}$ alkyl, $C_{17}$ alkyl, $C_{18}$ alkyl, $C_{19}$ alkyl or $C_{20}$ alkyl. In another aspect, the alkyl groups are octyl or lauryl or dodecyl. In another aspect, the sodium alkyl sulfate may be sodium octyl sulfate, sodium lauryl sulfate or sodium dodecyl sulfate.

In one aspect, the additive may be added to a product from a corn fermentation process stream at a rate of about 5 ppm by weight to about 5000 ppm by weight, based on the weight of the composition. In another aspect, the additive may be added to a product from a corn fermentation process stream at a rate of about 5 ppm by weight to about 2500 ppm by weight, based on the weight of the composition. In another aspect, the additive may be added to a product from a corn fermentation process stream at a rate of about 5 ppm by weight to about 2000 ppm by weight, based on the weight of the composition. In another aspect, the additive may be added to the product from a corn fermentation process stream at a rate of about 6 ppm by weight to about 1800 ppm by weight, based on the weight of the composition. In another aspect, the additive may be added at a rate of about 7 ppm by weight to about 1750 ppm by weight, based on the weight of the composition. In another aspect, the additive may be added at a rate of about 7 ppm by weight to about 1600 ppm by weight, based on the weight of the composition. In another aspect, the rate may be about 8 ppm by weight to about 1500 ppm by weight, based on the weight of the composition. In another aspect, the rate may be about 8 ppm by weight to about 1400 ppm by weight, based on the weight of the composition and in another aspect, the rate may be about 9 ppm by weight to about 1200 ppm by weight, based on the weight of the composition. In another aspect, the additive is added at a rate of about 10 ppm to about 1500 ppm by weight, based on the weight of the composition. In another aspect, the additive is added at a rate of about 10 ppm by weight to about 1400 ppm by weight, based on the weight of the composition. In another aspect, the additive is added at a rate of about 10 ppm by weight to about 1300 ppm by weight, based on the weight of the composition. In another aspect, the additive is added at a rate of about 10 ppm by weight to about 1200 ppm by weight, based on the weight of the composition. In another aspect, the additive is added at a rate of about 10 ppm by weight to about 1100 ppm by weight, based on the weight of the composition. In one aspect, the additive is added at a rate of about 10 ppm by weight to about 1000 ppm by weight, based on the weight of the composition. In another aspect, the additive is added at a rate of about 50 ppm by weight to about 1400 ppm by weight, based on the weight of the composition. In another aspect, the additive is added at a rate of about 100 ppm by weight to about 1300 ppm by weight, based on the weight of the composition. In another aspect, the additive is added at a rate of about 1200 ppm by weight to about 1500 ppm by weight, based on the weight of the composition. In another aspect, the additive is added at a rate of about 1100 ppm by weight to about 2000 ppm by weight, based on the weight of the composition. In another aspect, the additive is added at a rate of about 250 ppm by weight to about 1000 ppm by weight, based on the weight of the composition. In another aspect the additive is added at a rate of about 300 ppm by weight to about 900 ppm by weight, based on the weight of the composition. In another aspect, the additive is added at a rate of about 350 ppm by weight to about 800 ppm by weight, based on the weight of the composition. In another aspect, the additive may be added at a rate of about 400 ppm by weight to about 700 ppm by weight, and more particularly, at a rate of about 450 ppm by weight to about 600 ppm by weight, based on the weight of the composition. All subranges and whole numbers within these ranges are also contemplated, including 5, 10, 20, 50, 100, 200, 300, 400, 500, 600, 700, 800, 900, 1000, 1100, 1200, 1250, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900 and 5000. In one aspect, the additive is added to corn syrup at a rate of about 5 ppm by weight to about 5000 ppm by weight, based on the weight of the composition. In another aspect, the additive is added to whole stillage at a rate of about 5 ppm by weight to about 5000 ppm by weight, based on the weight of the composition. In another aspect, the additive is added to beer at a rate of about 5 ppm by weight to about 5000 ppm by weight, based on the weight of the composition.

In one aspect, the additive may be combined with other surfactants to improve the yield or quality of coproducts from the corn fermentation process stream. In one aspect, the surfactants are nonionic surfactants. In another aspect, the surfactants are anionic surfactants. In one aspect, the nonionic surfactants include, but are not limited to alkylphenol ethoxylate formaldehyde resins, alkyl phenol resins, alcohol alkoxylates, alkylpolyalkyleneoxides, alkylpolyglucosides, block copolymers of ethylene oxide and propylene oxide or butylene oxide and mixtures thereof, carboxylic amides, carboxylic esters, castor oil ethoxylates, fatty alcohols, glycol esters of fatty acids, monoalkanolamine condensates, ethoxylates, polyethylene glycol esters, polyoxyethylenes, polyoxyethylene fatty acid amides, polyoxyethylene sorbitan esters, fatty esters of alkoxylated glycerols (such as those described in U.S. Pat. No. 9,828,568, the teachings and contents of which are hereby incorporated by reference), alkoxylated plant oils, alkoxylated plant fats, alkoxylated animal oils, alkoxylated animal fats, alkyl polyglycoside, anhydrosorbitol ester and ethoxylated derivatives, polyethylene glycol hexadecyl ether (Cetomacrogol 1000), cetostearyl alcohol, cetyl alcohol, cocamide diethanolamine, cocamide methanolamine, decyl glucoside, decyl polyglucose, ethoxylated aliphatic alcohol, glycerol monostearate, octylphenoxypolyethoxyethanol (IGEPAL CA-630), polyethylene glycol ether of isocetyl alcohol (Isoceteth-20), lauryl glucoside, maltosides, monolaurin, mycosubtilin, octylphenoxypolyethoxyethanol (Nonidet P-40), nonoxynols, such as Nonoxynol-9, nonyl phenoxypolythoxyethanol (NP-40), octaethylene glycol monododecyl ether, N-octyl beta-D-thioglucopyranoside, octyl glucoside, oleyl alcohol, PEG-10 sunflower glycerides, pentaethylene glycol monododecyl ether, polidocanol, poloxamer, including Poloxamer 407, polyethoxylated tallow amine, polyglycerol polyricinoleate, ethoxylated soybean oil (such as used in Agnique® SBO 10 and Agnique® SBO 30 (both from BASF Corporation)), polysorbate including Polysorbate 20 and Polysorbate 80, sorbitan, sorbitan monolaurate, sorbitan monostearate, sorbitan tristearate, stearyl alcohol, surfactin, polyoxyethylene octyl phenyl ether (Triton X-100), polyoxyethylene sorbitan monooleate (Tween 80), and any combination thereof.

In another aspect, the anionic surfactants include, but are not limited to alkylbenzene sulfonates, alkylphenol ether sulfates, alkyl sulfates, carboxylates, napthalene sulfonates, olefin sulfonates, petroleum sulfonates, phosphates, phospholipids, soap, soap substitute, sulfates, ethoxylated sulfates, sulfonates, ammonium lauryl sulfate, ammonium perfluorononanoate, anionic derivatives of alkylpolyglucosides, anionic derivatives of fatty alcohols, chlorosulfolipid, sulfosuccinates, alkali metal salts of alkyl sulfosuccinates, such as dioctyl sulfosuccinate (Docusate), sodium dihexyl sulfosuccinate esters (Cola® Wet MA-80), sodium alkylsulfosuccinates, sodium sulfosuccinate esters, disodium cocoamphodiacetate, magnesium laureth sulfate, salts of perfluorobutanesulfonic acid, salts of perfluorononanoic acid, salts of perfluorooctanesulfonic acid, salts of perfluorooctanoic acid, phosphate esters, phosphate esters of polyalkyleneoxides, phosphate esters of sodium alkylsulfosuccinates, polyalkyleneoxides, potassium lauryl sulfate, sodium alkyl sulfate, sodium dodecyl sulfate (SDS), sodium laurate, sodium laureth sulfate (SLES), sodium lauryl sulfate (SLS), sodium lauroyl sarcosinate, sodium myreth sulfate, sodium nonanoyloxybenzenesulfonate, sodium pareth sulfate, sodium stearate, sulfolipid, sulfated alkanolamides, sulfated esters, sulfated natural oils and fats, sulfates, sulfonates, and any combination thereof.

In one aspect, the additive may comprise an alkylphenol ethoxylate formaldehyde and one or more other nonionic surfactants. In another aspect, the additive may comprise an alkylphenol ethoxylate formaldehyde and two other nonionic surfactants. In one aspect, the additive comprising alkylphenol ethoxylate formaldehyde resin may be combined with one or more salts, such as sodium alkyl sulfate. In another aspect, the additive comprises alkylphenol ethoxylate formaldehyde resin and sodium lauryl sulfate or sodium dodecyl sulfate. In another aspect, the additive comprises nonylphenol ethoxylate formaldehyde resin and sodium lauryl sulfate or sodium dodecyl sulfate. In another aspect, the additive comprises amylphenol ethoxylate formaldehyde resin and sodium lauryl sulfate or sodium dodecyl sulfate. In one aspect, the additive comprises alkylphenol ethoxylate formaldehyde resin in an amount of about 15% by weight to about 85% by weight and sodium alkyl sulfate in an amount of about 15% by weight to about 85% by weight, based on the weight of the additive. In another aspect, the additive comprises alkylphenol ethoxylate formaldehyde resin in an amount of about 20% by weight to about 80% by weight and sodium alkyl sulfate in an amount of about 20% by weight to about 80% by weight, based on the weight of the additive. In another aspect, the additive comprises alkylphenol ethoxylate formaldehyde resin in an amount of about 30% by weight to about 70% by weight and sodium alkyl sulfate in an amount of about 30% by weight to about 70% by weight, based on the weight of the additive. In another aspect, the additive comprises alkylphenol ethoxylate formaldehyde resin in an amount of about 40% by weight to about 60% by weight and sodium alkyl sulfate in an amount of about 40% by weight to about 60% by weight, based on the weight of the additive. In another aspect, the additive comprises alkylphenol ethoxylate formaldehyde resin in an amount of about 45% by weight to about 55% by weight and sodium alkyl sulfate in an amount of about 45% by weight to about 55% by weight, based on the weight of the additive. In another aspect, the additive comprises alkylphenol ethoxylate formaldehyde in an amount of about 80% by weight to about 85% by weight and sodium alkyl sulfate in an amount of about 15% by weight to about 20% by weight, wherein the amounts are based on the weight of the additive. In another aspect, the additive comprises alkylphenol ethoxylate formaldehyde in an amount of about 20% by weight to about 15% by weight and sodium alkyl sulfate in an amount of about 85% by weight to about 15% by weight, wherein the amounts are based on the weight of the additive.

In another aspect, the composition further comprises silica particles. Silica particles improve the yield of coproducts, such as corn oil, in a corn to ethanol process. In one aspect, the silica particles may be hydrophobic or hydrophilic.

In another aspect, the composition comprises corn syrup and an additive comprising alkylphenol ethoxylate formaldehyde resin. In another aspect, the composition comprises whole stillage and an additive comprising sodium alkyl sulfate. In another aspect, the composition comprises beer and an additive comprising sodium alkyl sulfate.

In another aspect of the present disclosure, a composition comprising a product from a corn fermentation process stream and an additive, wherein the additive comprises a blend of at least one anionic surfactant and at least one nonionic surfactant, and wherein a weight ratio of the at least one nonionic surfactant to the at least one anionic surfactant is in a weight range from about 1:20 to about 20:1, is provided.

Products from a corn fermentation stream are discussed above and with respect to FIG. 1. In one aspect, a product can be any product from a corn fermentation process stream or bioethanol process including, but not limited to, meal (after the corn has been milled), beer, stillage, such as whole stillage or thin stillage, wet cake (distillers wet grain), distillers dried grain, distillers dried grain with solubles and corn syrup. In one aspect, the product from a corn fermentation process stream is corn syrup.

In one aspect, the additive is a blend of surfactants. The inventors discovered that a blend of at least one nonionic surfactant and at least one anionic surfactant at appropriate ratios provided improved corn oil isolation and corn oil recovery from a product from a corn fermentation process stream at a reduced total cost.

In one aspect, the additive comprises a blend of at least one anionic surfactant and at least one nonionic surfactant. The anionic portion of the additive may include more than one anionic surfactants. In one aspect of the present disclosure, the anionic portion of the surfactant blend includes, but is not limited to alkylbenzene sulfonates, alkylphenol ether sulfates, alkyl sulfates, carboxylates, napthalene sulfonates, olefin sulfonates, petroleum sulfonates, phosphates, phospholipids, soap, soap substitute, sulfates, ethoxylated sulfates, sulfonates, ammonium lauryl sulfate, ammonium perfluorononanoate, anionic derivatives of alkylpolyglucosides, anionic derivatives of fatty alcohols, chlorosulfolipid, sulfosuccinates, alkali metal salts of alkyl sulfosuccinates, such as dioctyl sulfosuccinate (Docusate), sodium dihexyl sulfosuccinate esters (Cola® Wet MA-80), sodium alkylsulfosuccinates, sodium sulfosuccinate esters, disodium cocoamphodiacetate, magnesium laureth sulfate, salts of perfluorobutanesulfonic acid, salts of perfluorononanoic acid, salts of perfluorooctanesulfonic acid, salts of perfluorooctanoic acid, phosphate esters, phosphate esters of polyalkyleneoxides, phosphate esters of sodium alkylsulfosuccinates, polyalkyleneoxides, potassium lauryl sulfate, sodium alkyl sulfate, sodium dodecyl sulfate (SDS), sodium laurate, sodium laureth sulfate (SLES), sodium lauryl sulfate (SLS), sodium lauroyl sarcosinate, sodium myreth sulfate, sodium nonanoyloxybenzenesulfonate, sodium pareth sulfate, sodium stearate, sulfolipid, sulfated alkanolamides, sulfated esters, sulfated natural oils and fats, sulfates, sulfonates, and any combination thereof. In one aspect, the anionic surfactant is sodium lauryl sulfate.

In one aspect, the nonionic portion of the additive may comprise more than one nonionic surfactants. The nonionic surfactant may be a surfactant that is conventionally used for oil removal in a corn to ethanol process stream. In one aspect of the present disclosure, the nonionic portion of the surfactant blend includes, but is not limited to alkylphenol ethoxylate formaldehyde resins, alkyl phenol resins, alcohol alkoxylates, alkylpolyalkyleneoxides, alkylpolyglucosides, block copolymers of ethylene oxide and propylene oxide or butylene oxide and mixtures thereof, carboxylic amides, carboxylic esters, castor oil ethoxylates, fatty alcohols, glycol esters of fatty acids, monoalkanolamine condensates, ethoxylates, polyethylene glycol esters, polyoxyethylenes, polyoxyethylene fatty acid amides, polyoxyethylene sorbitan esters, fatty esters of alkoxylated glycerols (such as those described in U.S. Pat. No. 9,828,568, the teachings and contents of which are hereby incorporated by reference), alkoxylated plant oils, alkoxylated plant fats, alkoxylated animal oils, alkoxylated animal fats, alkyl polyglycoside, anhydrosorbitol ester and ethoxylated derivatives, polyethylene glycol hexadecyl ether (Cetomacrogol 1000), cetostearyl alcohol, cetyl alcohol, cocamide diethanolamine, cocamide methanolamine, decyl glucoside, decyl polyglucose, ethoxylated aliphatic alcohol, glycerol monostearate, octylphenoxypolyethoxyethanol (IGEPAL CA-630), polyethylene glycol ether of isocetyl alcohol (Isoceteth-20), lauryl glucoside, maltosides, monolaurin, mycosubtilin, octylphenoxypolyethoxyethanol (Nonidet P-40), nonoxynols, such as Nonoxynol-9, nonyl phenoxypolythoxyethanol (NP-40), octaethylene glycol monododecyl ether, N-octyl beta-D-thioglucopyranoside, octyl glucoside, oleyl alcohol, PEG-10 sunflower glycerides, pentaethylene glycol monododecyl ether, polidocanol, poloxamer, including Poloxamer 407, polyethoxylated tallow amine, polyglycerol polyricinoleate, ethoxylated soybean oil (such as used in Agnique® SBO 10 and Agnique® SBO 30 (both from BASF Corporation)), polysorbate including Polysorbate 20 and Polysorbate 80, sorbitan, sorbitan monolaurate, sorbitan monostearate, sorbitan tristearate, stearyl alcohol, surfactin, polyoxyethylene octyl phenyl ether (Triton X-100), polyoxyethylene sorbitan monooleate (Tween 80), and any combination thereof.

In one aspect, the nonionic surfactant is an alkylphenol ethoxylate formaldehyde resin. In another aspect, the nonionic surfactant is a nonylphenol ethoxylate formaldehyde resin or an amylphenol ethoxylate formaldehyde resin. In another aspect, the nonionic surfactant comprises at least one alkylphenol formaldehyde resin and one or more of another nonionic surfactants. In another aspect, the nonionic surfactant is polysorbate, such as Polysorbate 80. In another aspect, the nonionic surfactant is castor oil ethoxylate. In another aspect, the nonionic portion of the additive comprises two or more nonionic surfactants.

In one aspect of the present disclosure, the additive comprises a surfactant blend including at least one anionic surfactant and at least one non-ionic surfactant and the surfactants are in a weight ratio of the nonionic surfactant to the anionic surfactants in a range of from about 1:20 to about 20:1. In another aspect, the weight ratio of the nonionic surfactant to the anionic surfactant is in a range of from about 2:19 to about 19:2. In another aspect, the weight ratio is in a range of from about 3:18 to about 18:3. In another aspect, the weight ratio is in a range of from about 4:17 to about 17:4. In another aspect, the range is from about 5:16 to about 16:5. In another aspect, the range is from about 6:15 to about 15:6. In another aspect, the range is from about 7:14 to about 14:7. In another aspect, the range is from about 8:13 to about 13:8. In another aspect, the range is from about 9:12 to about 12:9 and more particularly, between about 10:11 to about 11:10. In another aspect, the range is from about 5:1 to 1:5. In another aspect, the range is from about 4.5:1.5 to about 1.5:4.5 and more particularly, from about 4.25:1.75 to about 1.75:4.25. In another aspect, the range is from about 4:1 to about 1:4. All ranges within the enumerated ratios form a part of the present disclosure.

In one aspect, the surfactant blend comprises the anionic surfactant in an amount of from about 5% by weight to about 50% by weight, based on the weight of the blend, as well as all ranges and values therebetween. In another aspect, the blend comprises the anionic surfactant in an amount of from about 7% by weight to about 35%, based on the weight of the blend. In another aspect, the anionic surfactant is in an amount of from about 10% by weight to about 30% by weight, based on the weight of the blend. In another aspect, the anionic surfactant is in an amount of from about 15% by weight to about 30% by weight, based on the weight of the blend. In another aspect, the anionic surfactant is in an amount of from about 18% by weight to about 25% by weight, based on the weight of the blend. In another aspect, the anionic surfactant is in the blend in the following amounts: 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 35%, 40%, 45%, and 50%, wherein each percent is a percent by weight based on the total weight of the blend.

In one aspect, the additive may be added to a product from a corn fermentation process stream at a rate of about 5 ppm by weight to about 5000 ppm by weight, based on the weight of the composition. In another aspect, the additive may be added to a product from a corn fermentation process stream at a rate of about 5 ppm by weight to about 2500 ppm by weight, based on the weight of the composition. In another aspect, the additive may be added to a product from a corn fermentation process stream at a rate of about 5 ppm by weight to about 2000 ppm by weight, based on the weight of the composition. In another aspect, the additive may be added to the product from a corn fermentation process stream at a rate of about 6 ppm by weight to about 1800 ppm by weight, based on the weight of the composition. In another aspect, the additive may be added at a rate of about 7 ppm by weight to about 1750 ppm by weight, based on the weight of the composition. In another aspect, the additive may be added at a rate of about 7 ppm by weight to about 1600 ppm by weight, based on the weight of the composition. In another aspect, the rate may be about 8 ppm by weight to about 1500 ppm by weight, based on the weight of the composition. In another aspect, the rate may be about 8 ppm by weight to about 1400 ppm by weight, based on the weight of the composition and in another aspect, the rate may be about 9 ppm by weight to about 1200 ppm by weight, based on the weight of the composition. In another aspect, the additive is added at a rate of about 10 ppm to about 1500 ppm by weight, based on the weight of the composition. In another aspect, the additive is added at a rate of about 10 ppm by weight to about 1400 ppm by weight, based on the weight of the composition. In another aspect, the additive is added at a rate of about 10 ppm by weight to about 1300 ppm by weight, based on the weight of the composition. In another aspect, the additive is added at a rate of about 10 ppm by weight to about 1200 ppm by weight, based on the weight of the composition. In another aspect, the additive is added at a rate of about 10 ppm by weight to about 1100 ppm by weight, based on the weight of the composition. In one aspect, the additive is added at a rate of about 10 ppm by weight to about 1000 ppm by weight, based on the weight of the composition. In another aspect, the additive is added at a rate of about 50 ppm by weight to about 1400 ppm by weight, based on the weight of the composition. In another aspect, the additive is added at a rate of about 100 ppm by weight to about 1300 ppm by weight, based on the weight of the composition. In another aspect, the additive is added at a rate of about 1200 ppm by weight to about 1500 ppm by weight, based on the weight of the composition. In another aspect, the additive is added at a rate of about 1100 ppm by weight to about 2000 ppm by weight, based on the weight of the composition. In another aspect, the additive is added at a rate of about 250 ppm by weight to about 1000 ppm by weight, based on the weight of the composition. In another aspect the additive is added at a rate of about 300 ppm by weight to about 900 ppm by weight, based on the weight of the composition. In another aspect, the additive is added at a rate of about 350 ppm by weight to about 800 ppm by weight, based on the weight of the composition. In another aspect, the additive may be added at a rate of about 400 ppm by weight to about 700 ppm by weight, and more particularly, at a rate of about 450 ppm by weight to about 600 ppm by weight, based on the weight of the composition. All subranges and whole numbers within these ranges are also contemplated, including 5, 10, 20, 50, 100, 200, 300, 400, 500, 600, 700, 800, 900, 1000, 1100, 1200, 1250, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900 and 5000. In one aspect, the additive is added to corn syrup at a rate of about 5 ppm by weight to about 5000 ppm by weight, based on the weight of the composition. In another aspect, the additive is added to whole stillage at a rate of about 5 ppm by weight to about 5000 ppm by weight, based on the weight of the composition. In another aspect, the additive is added to beer at a rate of about 5 ppm by weight to about 5000 ppm by weight, based on the weight of the composition.

In another aspect, the anionic portion of the surfactant blend may comprise from about 1 ppm by weight to about 2500 ppm by weight in the product from a corn fermentation process stream, based on the weight of the composition. In another aspect, the anionic portion comprises from about 5 ppm by weight to about 2000 ppm by weight, based on the weight of the composition. In another aspect, the anionic portion comprises from about 7 ppm by weight to about 1750 ppm by weight, based on the weight of the composition. In another aspect, the anionic portion comprises from about 8 ppm by weight to about 1500 ppm by weight, based on the weight of the composition. In another aspect, the anionic portion comprises from about 10 ppm by weight to about 1500 ppm by weight, based on the weight of the composition. In another aspect, the anionic portion comprises from about 10 ppm by weight to about 1400 ppm by weight, based on the weight of the composition. In another aspect, the anionic portion comprises from about 10 ppm by weight to about 1300 ppm by weight, based on the weight of the composition. In another aspect, the anionic portion comprises from about 10 ppm by weight to about 1200 ppm by weight, based on the weight of the composition. In another aspect, the anionic portion comprises from about 10 ppm by weight to about 1100 ppm by weight, based on the weight of the composition. In another aspect, the anionic portion comprises from 10 ppm by weight to about 1000 ppm by weight, based on the weight of the composition. In another aspect, the anionic portion may comprise from about 50 ppm by weight to about 1400 ppm by weight, based on the weight of the composition. In another aspect, the anionic portion comprises from about 100 ppm by weight to about 1300 ppm by weight, based on the weight of the composition. In another aspect, the anionic portion comprises from about 1200 ppm by weight to about 1500 ppm by weight, based on the weight of the composition. In another aspect, the anionic portion comprises from about 1100 ppm by weight to about 2000 ppm by weight, based on the weight of the composition. In another aspect, the anionic portion comprises between about 250 ppm by weight to about 1000 ppm by weight, based on the weight of the composition. In another aspect, the anionic portion comprises from about 300 ppm by weight to about 900 ppm by weight, based on the weight of the composition. In another aspect, the anionic portion comprises from about 350 ppm by weight to about 800 ppm by weight, based on the weight of the composition. In another aspect, the anionic portion comprises from about 400 ppm by weight to about 700 ppm by weight, and more particularly, from about 450 ppm by weight to about 600 ppm by weight, based on the weight of the composition. All subranges and whole numbers within any of these ranges are also contemplated including 1, 5, 10, 20, 50, 100, 200, 300, 400, 500, 600, 700, 800, 900, 1000, 1100, 1200, 1250, 1300, 1400, 1500, 1600, 1700, 1800, 1900, 2000, 2100, 2200, 2300, 2400, and 2500. In another aspect, the anionic portion of the surfactant blend may comprise from about 1 ppm by weight to about 2500 ppm by weight in corn syrup.

In another aspect, the composition further comprises silica particles. Silica particles improve the yield of coproducts, such as corn oil, in a corn to ethanol process. In one aspect, the silica particles may be hydrophobic or hydrophilic.

In one aspect, the additive comprises a blend of one anionic surfactant and two or more nonionic surfactants. In one aspect, the additive comprises one or more nonionic surfactants in an amount of about 15% by weight to about 85% by weight and sodium alkyl sulfate in an amount of about 15% by weight to about 85% by weight, based on the weight of the additive. In another aspect, the additive comprises one or more nonionic surfactants in an amount of about 20% by weight to about 80% by weight and sodium alkyl sulfate in an amount of about 20% by weight to about 80% by weight, based on the weight of the additive. In another aspect, the additive comprises one or more nonionic resins in an amount of about 30% by weight to about 70% by weight and sodium alkyl sulfate in an amount of about 30% by weight to about 70% by weight, based on the weight of the additive. In another aspect, the additive comprises one or more nonionic surfactants in an amount of about 40% by weight to about 60% by weight and sodium alkyl sulfate in an amount of about 40% by weight to about 60% by weight, based on the weight of the additive. In another aspect, the additive comprises one or more nonionic surfactants in an amount of about 45% by weight to about 55% by weight and sodium alkyl sulfate in an amount of about 45% by weight to about 55% by weight, based on the weight of the additive. In another aspect, the additive comprises one or more nonionic surfactants in an amount of about 80% by weight to about 85% by weight and sodium alkyl sulfate in an amount of about 15% by weight to about 20% by weight, wherein the amounts are based on the weight of the additive. In another aspect, the additive comprises one or more nonionic surfactants in an amount of about 20% by weight to about 15% by weight and sodium alkyl sulfate in an amount of about 85% by weight to about 15% by weight, wherein the amounts are based on the weight of the additive.

In another aspect, the additive comprises sodium lauryl sulfate or sodium dodecyl sulfate in an amount of about 15% by weight to about 20% by weight and one or more nonionic surfactants in an amount of from about 80% by weight to about 85% by weight, based on the weight of the composition. In another aspect of the present disclosure, the composition comprises: a) a product from a corn fermentation process stream; b) at least one anionic surfactant; c) at least one non-ionic surfactant; and d) at least one alkylphenol ethoxylate formaldehyde resin.

In another aspect of the disclosure, a method of increasing the amount of corn oil recovered from a product from a corn fermentation process stream comprising the steps of: contacting the product from a corn fermentation process stream with an additive selected from the group of alkylphenol ethoxylate formaldehyde resins, a blend of at least one anionic surfactant with at least one nonionic surfactant having a weight ratio of the at least one nonionic surfactant to the at least one anionic surfactant in a range from about 1:20 to about 20:1, a blend of at least one alkylphenol ethoxylate formaldehyde resin and at least one anionic surfactant, a blend of at least one alkylphenol ethoxylate formaldehyde resin and at least one other nonionic resin and any combination thereof to produce a mixture; centrifuging the mixture; and recovering corn oil from the mixture, wherein the amount of corn oil recovered from the mixture is greater than the amount of oil that would be recovered using the same process without inclusion of the additive.

Products from a corn fermentation stream are discussed above and with respect to FIG. 1. In one aspect, a product can be any product from a corn fermentation process stream or bioethanol process including, but not limited to, meal (after the corn has been milled), beer, stillage, such as whole stillage or thin stillage, wet cake (distillers wet grain), distillers dried grain, distillers dried grain with solubles and corn syrup. In one aspect, the product from a corn fermentation process stream is corn syrup. In another aspect, the product from a corn fermentation process stream is whole stillage. In another aspect, the product is thin stillage. In another aspect, the product is beer.

In another aspect of the disclosure, the surfactants and surfactant mixtures can be used to separate oil from a process stream. The method can be performed at any suitable point of the ethanol production process, such as is schematically shown in FIG. 1. As shown therein, the additives can be used at any point within the process stream. The order and application point can be adjusted in any number of ways. Some potential points include each instance designated "Chemical Aids", shown as reference numbers 25, 35, 45, 55, 65 and 75. In one aspect of the disclosure, the additive may be added to the corn meal at 25, after the milling process, 20, but before the cooking and liquification process, 30. In another aspect, the additive may be added to the corn mash at 35 after the starch has been converted to sugars during the cooking and liquification process, 30, and before fermentation, 40. In another aspect, the additive may be added to the beer at 45. In another aspect, the additive is added to the whole stillage at 55. In another aspect, the additive may be added to the thin stillage at 65 after centrifugation, 60. In another aspect, the additive may be added to the syrup at 75. The method can be performed at one point of the ethanol production process or at multiple points of the ethanol production process. The product from a corn fermentation stream can be in one or more forms. In each instance, at least some of the oil present would be separated from the solids and from the water. In one aspect, the corn fermentation stream is contacted as corn syrup.

In one aspect, the at least one additive comprises an alkylphenol ethoxylate formaldehyde resin. Alkylphenol ethoxylate formaldehyde resins are discussed above and can improve the yield of coproducts, such as corn oil. In some forms, the alkylphenol ethoxylate formaldehyde resin is a butylphenol ethoxylate formaldehyde resin, amylphenol ethoxylate formaldehyde resin, octylphenol ethoxylate formaldehyde resin, or nonylphenol ethoxylate formaldehyde resin. In another aspect, the alkylphenol ethoxylate formaldehyde resin is a nonylphenol ethoxylate formaldehyde resin or an amylphenol ethoxylate formaldehyde resin. In one aspect, the alkylphenol ethoxylate formaldehyde resins include, but are not limited to the BASOROL® products (BASF Corporation) including BASOROL® P DB-9942, BASOROL® P DB-9945, BASOROL® P DB-9946, BASOROL® P DB-9954A, BASOROL® P DB-9429, BASOROL® P DB-9954, BASOROL® P DB-9947, BASOROL® P DB-9955, BASOROL® P DB-9934, BASOROL® P DB-9958, BASOROL® P DB-9935, and any combination thereof.

In one aspect, the additive is a blend of at least one nonionic surfactant and at least one anionic surfactant having a ratio of the at least one nonionic surfactant to the at least one anionic surfactant in a weight range from about 1:20 to about 20:1. The blend and ratio of the at least one anionic surfactant and the at least one nonionic surfactant are discussed above and can improve the yield and quality of coproducts.

In one aspect, the anionic portion of the additive may comprise more than one anionic surfactants. In one aspect of the present disclosure, the anionic surfactant includes, but is not limited to alkylbenzene sulfonates, alkylphenol ether sulfates, alkyl sulfates, carboxylates, napthalene sulfonates, olefin sulfonates, petroleum sulfonates, phosphates, phospholipid, soap, soap substitute, sulfates, ethoxylated sulfates, sulfonates, ammonium lauryl sulfate, ammonium perfluorononanoate, anionic derivatives of alkylpolyglucosides, anionic derivatives of fatty alcohols, chlorosulfolipid, sulfosuccinates, alkali metal salts of alkyl sulfosuccinates, such as dioctyl sulfosuccinate (Docusate), sodium dihexyl sulfosuccinate esters (Cola® Wet MA-80), sodium alkylsulfosuccinates, sodium sulfosuccinate esters, disodium cocoamphodiacetate, magnesium laureth sulfate, salts of perfluorobutanesulfonic acid, salts of perfluorononanoic acid, salts of perfluorooctanesulfonic acid, salts of perfluorooctanoic acid, phosphate esters, phosphate esters of polyalkyleneoxides, phosphate esters of sodium alkylsulfosuccinates, polyalkyleneoxides, potassium lauryl sulfate, sodium alkyl sulfate, sodium dodecyl sulfate (SDS), sodium laurate, sodium laureth sulfate (SLES), sodium lauryl sulfate (SLS), sodium lauroyl sarcosinate, sodium myreth sulfate, sodium nonanoyloxybenzenesulfonate, sodium pareth sulfate, sodium stearate, sulfolipid, sulfated alkanolamides, sulfated esters, sulfated natural oils and fats, sulfates, sulfonates, and any combination thereof. In one aspect, the anionic surfactant is SDS or SLS.

In one aspect, the surfactant blend comprises the anionic surfactant in an amount of from about 5% by weight to about 50% by weight, based on the weight of the blend, as well as all ranges and values therebetween. In another aspect, the blend comprises the anionic surfactant in an amount of from about 7% by weight to about 35%, based on the weight of the blend. In another aspect, the anionic surfactant is in an amount of from about 10% by weight to about 30% by weight, based on the weight of the blend. In another aspect, the anionic surfactant is in an amount of from about 15% by weight to about 30% by weight, based on the weight of the blend. In another aspect, the anionic surfactant is in an amount of from about 18% by weight to about 25% by weight, based on the weight of the blend. In another aspect, the anionic surfactant is in the blend in the following amounts: 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 35%, 40%, 45%, and 50%, wherein each percent is a percent by weight based on the total weight of the blend.

In one aspect, the nonionic portion of the additive may comprise more than one nonionic surfactant. The nonionic surfactant may be a surfactant that is conventionally used for oil removal in a corn to ethanol process stream. In one aspect of the present disclosure, the nonionic surfactant includes, but is not limited to alkylphenol ethoxylate formaldehyde resins, alkyl phenol resins, alcohol alkoxylates, alkylpolyalkyleneoxides, alkylpolyglucosides, block copolymers of ethylene oxide and propylene oxide or butylene oxide and mixtures thereof, carboxylic amides, carboxylic esters, castor oil ethoxylates, fatty alcohols, glycol esters of fatty acids, monoalkanolamine condensates, ethoxylates, polyethylene glycol esters, polyoxyethylenes, polyoxyethylene fatty acid amides, polyoxyethylene sorbitan esters, fatty esters of alkoxylated glycerols (such as those described in U.S. Pat. No. 9,828,568, the teachings and contents of which are hereby incorporated by reference), alkoxylated plant oils, alkoxylated plant fats, alkoxylated animal oils, alkoxylated animal fats, alkyl polyglycoside, anhydrosorbitol ester and ethoxylated derivatives, polyethylene glycol hexadecyl ether (Cetomacrogol 1000), cetostearyl alcohol, cetyl alcohol, cocamide diethanolamine, cocamide methanolamine, decyl glucoside, decyl polyglucose, ethoxylated aliphatic alcohol, glycerol monostearate, octylphenoxypolyethoxyethanol (IGEPAL CA-630), polyethylene glycol ether of isocetyl alcohol (Isoceteth-20), lauryl glucoside, maltosides, monolaurin, mycosubtilin, octylphenoxypolyethoxyethanol (Nonidet P-40), nonoxynols, such as Nonoxynol-9, nonyl phenoxypolythoxyethanol (NP-40), octaethylene glycol monododecyl ether, N-octyl beta-D-thioglucopyranoside, octyl glucoside, oleyl alcohol, PEG-10 sunflower glycerides, pentaethylene glycol monododecyl ether, polidocanol, poloxamer, including Poloxamer 407, polyethoxylated tallow amine, polyglycerol polyricinoleate, ethoxylated soybean oil (such as used in Agnique® SBO 10 and Agnique® SBO 30 (both from BASF Corporation)), polysorbate including Polysorbate 20 and Polysorbate 80, sorbitan, sorbitan monolaurate, sorbitan monostearate, sorbitan tristearate, stearyl alcohol, surfactin, polyoxyethylene octyl phenyl ether (Triton X-100), polyoxyethylene sorbitan monooleate (Tween 80), and any combination thereof.

In one aspect, the nonionic surfactant is an alkylphenol ethoxylate formaldehyde resin. In another aspect, the nonionic surfactant is a nonylphenol ethoxylate formaldehyde resin or an amylphenol ethoxylate formaldehyde resin. In another aspect, the nonionic surfactant comprises at least one alkylphenol formaldehyde resin and one or more other nonionic surfactants. In another aspect, the nonionic surfactant is polysorbate, such as Polysorbate 80. In another aspect, the nonionic surfactant is castor oil ethoxylate. In another aspect, the additive comprises two or more nonionic surfactants.

In one aspect, the additive comprises a blend of at least one alkylphenol ethoxylate formaldehyde resin and at least one anionic surfactant. In another aspect, the additive comprises a blend of at least one alkylphenol ethoxylate formaldehyde resin and at least one nonionic surfactant, where the nonionic surfactants are previously described. In another aspect, the additive comprises at least one alkylphenol ethoxylate formaldehyde resin, at least one anionic surfactant and at least one nonionic surfactant. In one aspect, the additive comprising alkylphenol ethoxylate formaldehyde resin may be combined with one or more salts, such as sodium alkyl sulfate. In another aspect, the additive comprises alkylphenol ethoxylate formaldehyde resin and sodium lauryl sulfate or sodium dodecyl sulfate. In another aspect, the additive comprises nonylphenol ethoxylate formaldehyde resin and sodium lauryl sulfate or sodium dodecyl sulfate. In another aspect, the additive comprises amylphenol ethoxylate formaldehyde resin and sodium lauryl sulfate or sodium dodecyl sulfate. In one aspect, the additive comprises alkylphenol ethoxylate formaldehyde resin in an amount of about 15% by weight to about 85% by weight and sodium alkyl sulfate in an amount of about 15% by weight to about 85% by weight, based on the weight of the additive. In another aspect, the additive comprises alkylphenol ethoxylate formaldehyde resin in an amount of about 20% by weight to about 80% by weight and sodium alkyl sulfate in an amount of about 20% by weight to about 80% by weight, based on the weight of the additive. In another aspect, the additive comprises alkylphenol ethoxylate formaldehyde resin in an amount of about 30% by weight to about 70% by weight and sodium alkyl sulfate in an amount of about 30% by weight to about 70% by weight, based on the weight of the additive. In another aspect, the additive comprises alkylphenol ethoxylate formaldehyde resin in an amount of about 40% by weight to about 60% by weight and sodium alkyl sulfate in an amount of about 40% by weight to about 60% by weight, based on the weight of the additive. In another aspect, the additive comprises alkylphenol ethoxylate formaldehyde resin in an amount of about 45% by weight to about 55% by weight and sodium alkyl sulfate in an amount of about 45% by weight to about 55% by weight, based on the weight of the additive. In another aspect, the additive comprises alkylphenol ethoxylate formaldehyde in an amount of about 80% by weight to about 85% by weight and sodium alkyl sulfate in an amount of about 15% by weight to about 20% by weight, wherein the amounts are based on the weight of the additive. In another aspect, the additive comprises alkylphenol ethoxylate formaldehyde in an amount of about 20% by weight to about 15% by weight and sodium alkyl sulfate in an amount of about 85% by weight to about 15% by weight, wherein the amounts are based on the weight of the additive.

The additive and product from the corn fermentation process stream are combined to form a mixture, which may be heated. Heating the mixture can aid in recovering corn oil, but can also darken the corn oil and form fatty acids, which negatively affects the quality of the corn oil. The additive in the mixture can enhance corn oil separation without heating the mixture or by heating the mixture to a lower temperature, which results in a lighter corn oil having increased clarity and decreased turbidity. In one aspect, the mixture is heated to a temperature of 90° C. The mixture is centrifuged to separate the oil from the solids and water present in the product from the corn fermentation stream. In one aspect, the additive is added to corn syrup and the mixture is heated to 90° C. and centrifuged to separate the oil from the product.

The method improves the yield of corn oil by recovering a greater amount from the products from a corn fermentation process stream than would be recovered without the addition of the additives. In some aspects, the yield of corn oil is increased in comparison to conventional surfactants. In one aspect, the increased yield amount of corn oil may be over at least 10%. In another aspect, the increased yield amount may be at least 20%. In other aspects, the increased yield amounts may be at least a percentage including but not limited to 30%, 40%, 50%, 60%, 70%, 80%, 90%, 100%, 125%, 150%, 175%, 200%, 225%, 250%, 275%, 300%, 325%, 350%, 400%, 450%, 500%, 550%, 600%, 650%, 700%, 750%, 800%, 850%, 900%, 950% and 1000%.

In one aspect, the additive may be added to a product from a corn fermentation process stream at a rate of about 5 ppm by weight to about 5000 ppm by weight, based on the weight of the mixture. In another aspect, the additive may be added to a product from a corn fermentation process stream at a rate of about 5 ppm by weight to about 2500 ppm by weight, based on the weight of the mixture. In another aspect, the additive may be added to a product from a corn fermentation process stream at a rate of about 5 ppm by weight to about 2000 ppm by weight, based on the weight of the mixture. In another aspect, the additive may be added to the product from a corn fermentation process stream at a rate of about 6 ppm by weight to about 1800 ppm by weight, based on the weight of the mixture. In another aspect, the additive may be added at a rate of about 7 ppm by weight to about 1750 ppm by weight, based on the weight of the mixture. In another aspect, the additive may be added at a rate of about 7 ppm by weight to about 1600 ppm by weight, based on the weight of the mixture. In another aspect, the rate may be about 8 ppm by weight to about 1500 ppm by weight, based on the weight of the mixture. In another aspect, the rate may be about 8 ppm by weight to about 1400 ppm by weight, based on the weight of the mixture and in another aspect, the rate may be about 9 ppm by weight to about 1200 ppm by weight, based on the weight of the mixture. In another aspect, the additive is added at a rate of about 10 ppm to about 1500 ppm by weight, based on the weight of the mixture. In another aspect, the additive is added at a rate of about 10 ppm by weight to about 1400 ppm by weight, based on the weight of the mixture. In another aspect, the additive is added at a rate of about 10 ppm by weight to about 1300 ppm by weight, based on the weight of the mixture. In another aspect, the additive is added at a rate of about 10 ppm by weight to about 1200 ppm by weight, based on the weight of the mixture. In another aspect, the additive is added at a rate of about 10 ppm by weight to about 1100 ppm by weight, based on the weight of the mixture. In one aspect, the additive is added at a rate of about 10 ppm by weight to about 1000 ppm by weight, based on the weight of the mixture. In another aspect, the additive is added at a rate of about 50 ppm by weight to about 1400 ppm by weight, based on the weight of the mixture. In another aspect, the additive is added at a rate of about 100 ppm by weight to about 1300 ppm by weight, based on the weight of the mixture. In another aspect, the additive is added at a rate of about 1200 ppm by weight to about 1500 ppm by weight, based on the weight of the mixture. In another aspect, the additive is added at a rate of about 1100 ppm by weight to about 2000 ppm by weight, based on the weight of the mixture. In another aspect, the additive is added at a rate of about 250 ppm by weight to about 1000 ppm by weight, based on the weight of the mixture. In another aspect the additive is added at a rate of about 300 ppm by weight to about 900 ppm by weight, based on the weight of the mixture. In another aspect, the additive is added at a rate of about 350 ppm by weight to about 800 ppm by weight, based on the weight of the mixture. In another aspect, the additive may be added at a rate of about 400 ppm by weight to about 700 ppm by weight, and more particularly, at a rate of about 450 ppm by weight to about 600 ppm by weight, based on the weight of the mixture. All subranges and whole numbers within these ranges are also contemplated, including 5, 10, 20, 50, 100, 200, 300, 400, 500, 600, 700, 800, 900, 1000, 1100, 1200, 1250, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900 and 5000. In one aspect, the additive is added to corn syrup at a rate of about 5 ppm by weight to about 5000 ppm by weight, based on the weight of the mixture. In another aspect, the additive is added to whole stillage at a rate of about 5 ppm by weight to about 5000 ppm by weight, based on the weight of the mixture. In another aspect, the additive is added to beer at a rate of about 5 ppm by weight to about 5000 ppm by weight, based on the weight of the mixture.

In one aspect, an additive comprises an anionic surfactant and nonionic surfactant and is mixed with corn meal. In another aspect, an additive comprising an anionic surfactant and nonionic surfactant is mixed with whole stillage. In another aspect, an additive comprising an anionic surfactant and a nonionic surfactant may be mixed with thin stillage. In another aspect, an additive comprising an alkylphenol ethoxylate formaldehyde resin may be mixed with corn meal. In another aspect, an alkylphenol ethoxylate formaldehyde resin may be mixed with whole stillage. In another aspect, an additive comprising an alkylphenol ethoxylate formaldehyde resin may be mixed with thin stillage. In another aspect, an additive comprising alkylphenol ethoxylate formaldehyde resin, anionic surfactant and nonionic surfactant may be mixed with corn meal. In another aspect, an additive comprising an alkylphenol ethoxylate formaldehyde resin, an anionic surfactant and nonionic surfactant may be mixed with whole stillage. In another aspect, an additive comprising an alkylphenol ethoxylate formaldehyde resin, an anionic surfactant and a nonionic surfactant may be mixed with thin stillage.

In another aspect, silica particles may be added to the mixture. Silica particles improve the yield of coproducts, such as corn oil, in a corn to ethanol process. In one aspect, the silica particles may be hydrophobic or hydrophilic.

In one aspect of the disclosure, the method can be performed at one point in the corn fermentation process stream or at multiple points of the corn fermentation process stream. The products from a corn fermentation process stream can be in one or more forms. In one aspect, the method comprises the steps of contacting a product from a corn fermentation process stream a first time with a first additive selected from the group of alkylphenol ethoxylate formaldehyde resins, a blend of at least one anionic surfactant and at least one nonionic surfactant having a weight ratio of the at least one nonionic surfactant to the at least one anionic surfactant in an amount of from about 1:20 to 20:1, an alkylphenol ethoxylate formaldehyde resin in combination with at least one anionic surfactant, and any combination thereof to produce a first mixture; centrifuging the first mixture; and recovering the oil from the first mixture; wherein the amount of oil recovered from the first mixture is greater than the amount of oil that would be recovered using the same process without inclusion of the additive. In another aspect, the method comprises the steps of contacting the product from a corn fermentation a second time with the first additive. In one aspect, the first additive may be split or added in two or more locations in the corn fermentation process. For example, in one aspect, the first additive is a blend of an anionic surfactant and a nonionic surfactant and the anionic surfactant is added at a first time and the nonionic surfactant is added at a second time. In another aspect, the method comprises the steps of contacting the product from a corn fermentation process a first time with a first additive and contacting a product from a corn fermentation process a second time with the first additive. In one aspect, the method comprises contacting whole stillage with a first additive and subsequently, contacting corn syrup with the first additive.

In one aspect, the method comprises the steps of contacting the product from a corn fermentation process a first time with a first additive selected from the group of alkylphenol ethoxylate formaldehyde resins, a blend of at least one anionic surfactant and at least one non-ionic surfactant where the blend has a weight ratio of the at least one nonionic surfactant to the at least one anionic surfactant in an amount of from about 1:20 to about 20:1, an alkylphenol ethoxylate formaldehyde resin in combination with at least one anionic surfactant, and any combination thereof to produce a first mixture and contacting the product from a corn fermentation process a second time with a second additive selected from the group of alkylphenol ethoxylate formaldehyde resins, a blend of at least one anionic surfactant and at least one non-ionic surfactant where the blend has a weight ratio of the at least one nonionic surfactant to the at least one anionic surfactant in an amount of about 1:20 to about 20:1, an alkylphenol ethoxylate formaldehyde resin in combination with at least one anionic surfactant, and any combination thereof to produce a second mixture; centrifuging the second mixture and recovering oil from the second mixture, wherein the amount of oil recovered from the second mixture is greater than the amount of oil that would be recovered using the same process without inclusion of the additive. In one aspect, the method comprises the steps of contacting the product from a corn fermentation process a first time with a first additive and contacting a product from a corn fermentation process a second time with a second additive. In one aspect, the first additive and second additive are different. In one aspect, the method comprises contacting whole stillage with a first additive and subsequently, contacting corn syrup with a second additive. In one aspect, the first additive may be an alkylphenol ethoxylate formaldehyde resin and the second additive may be a blend of at least one anionic and at least one nonionic surfactant having a weight ratio in an amount of the at least one nonionic surfactant to the at least one anionic surfactant in an amount of about 1:20 to about 20:1. In other aspects, the first additive and the second additive contact the product from a corn fermentation process stream at different times or stages of the corn fermentation process. In one aspect, the different times are at different stages of the corn fermentation process.

In another aspect of the disclosure, the surfactants and surfactant blends may be added together, as well as sequentially. The surfactants can be added in any order, may be added together or may be added at different times in the corn fermentation process and the method will benefit from the synergistic effects that are obtained from the blend of the surfactants. In one aspect, an anionic surfactant can be added at any point in the corn fermentation process and a nonionic surfactant can be added at another point in the process. In another aspect, a nonionic surfactant may be added to whole stillage and an anionic surfactant may be added to thin stillage. In another aspect, an alkylphenol ethoxylate formaldehyde resin may be added to beer, a nonionic surfactant may be added to whole stillage, and an anionic surfactant may be added to thin stillage.

In another aspect of the disclosure, a method of increasing the amount of protein separated and recovered in a coproduct from a product from a corn fermentation process stream comprising the steps of contacting the product from a corn fermentation process stream with at least one additive selected from the group of alkylphenol ethoxylate formaldehyde resins, sodium alkyl sulfate, a blend of at least one anionic surfactant with at least one nonionic surfactant having a weight ratio of the at least one nonionic surfactant to the at least one anionic surfactant having a weight ratio of the at least one nonionic surfactant to the at least one anionic surfactant in a range from about 1:20 to about 20:1, a blend of at least one alkylphenol ethoxylate formaldehyde resin and at least one anionic surfactant, a blend of sodium alkyl sulfate and at least one nonionic surfactant, at least one nonionic surfactant, and any combinations thereof, to produce a mixture; separating protein from the mixture and recovering a coproduct comprising the protein, wherein the amount of protein recovered in the coproduct is greater than the amount of protein that would be recovered using the same process without inclusion of the additive.

Products from a corn fermentation process stream are discussed above and with respect to FIG. 1. In one aspect, a product can be any product from a corn fermentation process stream or bioethanol process including, but not limited to, meal (after the corn has been milled), beer, stillage, such as whole stillage or thin stillage, wet cake (distillers wet grain), distillers dried grain, distillers dried grain with solubles and corn syrup. In one aspect, the product from a corn fermentation process stream is whole stillage. In another aspect, the product is beer.

The method can be performed at any suitable point of the corn fermentation process stream, such as is schematically shown in FIG. 1 and discussed previously. The method can be performed at one point of the corn fermentation process stream or at multiple points of the corn fermentation process stream. The products from a corn fermentation process stream can be in one or more forms. In each instance, at least some of the protein present would be separated from the products. In one aspect, the corn fermentation stream is contacted as whole stillage. In another aspect, the corn fermentation stream is contacted as beer. In another aspect, the corn fermentation stream is contacted initially as whole stillage and subsequently as corn syrup. In another aspect, the corn fermentation stream is contact initially as beer and subsequently, as corn syrup.

The at least one additive enhances protein isolation from a corn fermentation stream. In one aspect, the at least one additive comprises alkylphenol ethoxylate formaldehyde resins. As discussed previously, the alkylphenol ethoxylate formaldehyde resin may be a butylphenol ethoxylate formaldehyde resin, an amylphenol ethoxylate formaldehyde resin, an octylphenol ethoxylate formaldehyde resin, or a nonylphenol ethoxylate formaldehyde resin. In another aspect, the alkylphenol ethoxylate formaldehyde resin is a nonylphenol ethoxylate formaldehyde resin or an amylphenol ethoxylate formaldehyde resin. In one aspect, the alkylphenol ethoxylate formaldehyde resins include, but are not limited to the BASOROL® products (BASF Corporation) including BASOROL® P DB-9942, BASOROL® P DB-9945, BASOROL® P DB-9946, BASOROL® P DB-9954A, BASOROL® P DB-9429, BASOROL® P DB-9954, BASOROL® P DB-9947, BASOROL® P DB-9955, BASOROL® P DB-9934, BASOROL® P DB-9958, BASOROL® P DB-9935, and any combination thereof.

In one aspect, the at least one additive comprises sodium alkyl sulfate. In one aspect, the alkyl group may comprise $C_5$-$C_{20}$ alkyl groups. In another aspect, the alkyl group may be pentyl, hexyl, heptyl, octyl, nonyl, decyl, undecyl, dodecyl or lauryl, $C_{13}$ alkyl, $C_{14}$ alkyl, $C_{15}$ alkyl, $C_{16}$ alkyl, $C_{17}$ alkyl, $C_{18}$ alkyl, $C_{19}$ alkyl or $C_{20}$ alkyl. In another aspect, the alkyl groups are octyl or lauryl or dodecyl. In another aspect, the sodium alkyl sulfate may be sodium octyl sulfate, sodium lauryl sulfate or sodium dodecyl sulfate. In one aspect, sodium alkyl sulfate may be sodium lauryl sulfate or sodium dodecyl sulfate.

In one aspect, the additive is at least one nonionic surfactant or a nonionic blend of at least one nonionic surfactant and at least one anionic surfactant having a ratio of the at least one nonionic surfactant to the at least one anionic surfactant in a range from about 1:20 to about 20:1. The nonionic surfactant and blend and weight ratio of the at least one anionic surfactant and the at least one nonionic surfactant are discussed above and can improve the yield and quality of coproducts.

In one aspect, the anionic portion of the additive may comprise more than one anionic surfactants. In one aspect of the present disclosure, the anionic surfactant includes, but is not limited to alkylbenzene sulfonates, alkylphenol ether sulfates, alkyl sulfates, carboxylates, napthalene sulfonates, olefin sulfonates, petroleum sulfonates, phosphates, phospholipid, soap, soap substitute, sulfates, ethoxylated sulfates, sulfonates, ammonium lauryl sulfate, ammonium perfluorononanoate, anionic derivatives of alkylpolyglucosides, anionic derivatives of fatty alcohols, chlorosulfolipid, sulfosuccinates, alkali metal salts of alkyl sulfosuccinates, such as dioctyl sulfosuccinate (Docusate), sodium dihexyl sulfosuccinate esters (Cola® Wet MA-80), sodium alkylsulfosuccinates, sodium sulfosuccinate esters, disodium cocoamphodiacetate, magnesium laureth sulfate, salts of perfluorobutanesulfonic acid, salts of perfluorononanoic acid, salts of perfluorooctanesulfonic acid, salts of perfluorooctanoic acid, phosphate esters, phosphate esters of polyalkyleneoxides, phosphate esters of sodium alkylsulfosuccinates, polyalkyleneoxides, potassium lauryl sulfate, sodium alkyl sulfate, sodium dodecyl sulfate (SDS), sodium laurate, sodium laureth sulfate (SLES), sodium lauryl sulfate (SLS), sodium lauroyl sarcosinate, sodium myreth sulfate, sodium nonanoyloxybenzenesulfonate, sodium pareth sulfate, sodium stearate, sulfolipid, sulfated alkanolamides, sulfated esters, sulfated natural oils and fats, sulfates, sulfonates, and any combination thereof.

In one aspect, the nonionic portion of the additive or the at least one nonionic surfactant may comprise more than one nonionic surfactant. In one aspect of the present disclosure, the nonionic surfactant includes, but is not limited to alkylphenol ethoxylate formaldehyde resins, alkyl phenol resins, alcohol alkoxylates, alkylpolyalkyleneoxides, alkylpolyglucosides, block copolymers of ethylene oxide and propylene oxide or butylene oxide and mixtures thereof, carboxylic amides, carboxylic esters, castor oil ethoxylates, fatty alcohols, glycol esters of fatty acids, monoalkanolamine condensates, ethoxylates, polyethylene glycol esters, polyoxyethylenes, polyoxyethylene fatty acid amides, polyoxyethylene sorbitan esters, fatty esters of alkoxylated glycerols (such as those described in U.S. Pat. No. 9,828,568, the teachings and contents of which are hereby incorporated by reference), alkoxylated plant oils, alkoxylated plant fats, alkoxylated animal oils, alkoxylated animal fats, alkyl polyglycoside, anhydrosorbitol ester and ethoxylated derivatives, polyethylene glycol hexadecyl ether (Cetomacrogol 1000), cetostearyl alcohol, cetyl alcohol, cocamide diethanolamine, cocamide methanolamine, decyl glucoside, decyl polyglucose, ethoxylated aliphatic alcohol, glycerol monostearate, octylphenoxypolyethoxyethanol (IGEPAL CA-630), polyethylene glycol ether of isocetyl alcohol (Isoceteth-20), lauryl glucoside, maltosides, monolaurin, mycosubtilin, octylphenoxypolyethoxyethanol (Nonidet P-40), nonoxynols, such as Nonoxynol-9, nonyl phenoxypolythoxyethanol (NP-40), octaethylene glycol monododecyl ether, N-octyl beta-D-thioglucopyranoside, octyl glucoside, oleyl alcohol, PEG-10 sunflower glycerides, pentaethylene glycol monododecyl ether, polidocanol, poloxamer, including Poloxamer 407, polyethoxylated tallow amine, polyglycerol polyricinoleate, ethoxylated soybean oil (such as used in Agnique® SBO 10 and Agnique® SBO 30 (both from BASF Corporation)), polysorbate including Polysorbate 20 and Polysorbate 80, sorbitan, sorbitan monolaurate, sorbitan monostearate, sorbitan tristearate, stearyl alcohol, surfactin, polyoxyethylene octyl phenyl ether (Triton X-100), polyoxyethylene sorbitan monooleate (Tween 80), and any combination thereof.

In one aspect, the additive is SDS or SLS. In another aspect, the additive is a blend of at least one alkylphenol ethoxylate formaldehyde resin and at least one anionic surfactant. In another aspect, the additive is a blend of a blend of sodium alkyl sulfate and at least one nonionic surfactant. In another aspect, the additive is an alkylphenol ethoxylate formaldehyde resin. In another aspect, the additive is a nonionic surfactant.

In one aspect, protein may be isolated by centrifuging the mixture comprising additive and product from a corn fermentation process stream. In another aspect, the recovered coproduct comprises dried distilled grains with solubles. In another aspect, the mixture comprises sodium lauryl sulfate or sodium dodecyl sulfate and whole stillage and the recovered coproduct comprises dried distilled grains with solubles. In another aspect, the mixture comprises sodium lauryl sulfate or sodium dodecyl sulfate and beer and the recovered coproduct comprises dried distilled grains with solubles.

The additive and product from the corn fermentation process stream are combined to form a mixture, which may be heated. In one aspect, the mixture is heated to a temperature of 90° C. The mixture is centrifuged to separate protein from the solids and water present in the product from the corn fermentation stream. In one aspect, the additive is added to beer and the mixture is heated to 90° C. and centrifuged to separate the protein from the product. In another aspect, the additive is added to whole stillage and the mixture is heated to 90° C. and centrifuged to separate protein from the product.

In one aspect, the additive may be added to a product from a corn fermentation process stream at a rate of about 5 ppm by weight to about 5000 ppm by weight, based on the weight of the composition. In another aspect, the additive may be added to a product from a corn fermentation process stream at a rate of about 5 ppm by weight to about 2500 ppm by weight, based on the weight of the composition. In another aspect, the additive may be added to a product from a corn fermentation process stream at a rate of about 5 ppm by weight to about 2000 ppm by weight, based on the weight of the composition. In another aspect, the additive may be added to the product from a corn fermentation process stream at a rate of about 6 ppm by weight to about 1800 ppm by weight, based on the weight of the composition. In another aspect, the additive may be added at a rate of about 7 ppm by weight to about 1750 ppm by weight, based on the weight of the composition. In another aspect, the additive may be added at a rate of about 7 ppm by weight to about 1600 ppm by weight, based on the weight of the composition. In another aspect, the rate may be about 8 ppm by weight to about 1500 ppm by weight, based on the weight of the composition. In another aspect, the rate may be about 8 ppm by weight to about 1400 ppm by weight, based on the weight of the composition and in another aspect, the rate may be about 9 ppm by weight to about 1200 ppm by weight, based on the weight of the composition. In another aspect, the additive is added at a rate of about 10 ppm to about 1500 ppm by weight, based on the weight of the composition. In another aspect, the additive is added at a rate of about 10 ppm by weight to about 1400 ppm by weight, based on the weight of the composition. In another aspect, the additive is added at a rate of about 10 ppm by weight to about 1300 ppm by weight, based on the weight of the composition. In another aspect, the additive is added at a rate of about 10 ppm by weight to about 1200 ppm by weight, based on the weight of the composition. In another aspect, the additive is added at a rate of about 10 ppm by weight to about 1100 ppm by weight, based on the weight of the composition. In one aspect, the additive is added at a rate of about 10 ppm by weight to about 1000 ppm by weight, based on the weight of the composition. In another aspect, the additive is added at a rate of about 50 ppm by weight to about 1400 ppm by weight, based on the weight of the composition. In another aspect, the additive is added at a rate of about 100 ppm by weight to about 1300 ppm by weight, based on the weight of the composition. In another aspect, the additive is added at a rate of about 1200 ppm by weight to about 1500 ppm by weight, based on the weight of the composition. In another aspect, the additive is added at a rate of about 1100 ppm by weight to about 2000 ppm by weight, based on the weight of the composition. In another aspect, the additive is added at a rate of about 250 ppm by weight to about 1000 ppm by weight, based on the weight of the composition. In another aspect the additive is added at a rate of about 300 ppm by weight to about 900 ppm by weight, based on the weight of the composition. In another aspect, the additive is added at a rate of about 350 ppm by weight to about 800 ppm by weight, based on the weight of the composition. In another aspect, the additive may be added at a rate of about 400 ppm by weight to about 700 ppm by weight, and more particularly, at a rate of about 450 ppm by weight to about 600 ppm by weight, based on the weight of the composition. All subranges and whole numbers within these ranges are also contemplated, including 5, 10, 20, 50, 100, 200, 300, 400, 500, 600, 700, 800, 900, 1000, 1100, 1200, 1250, 1300, 1400, 1500, 1600, 1700, 1800, 1900, 2000, 2100, 2200, 2300, 2400, and 2500. In one aspect, the additive is added to corn syrup at a rate of about 5 ppm by weight to about 5000 ppm by weight, based on the weight of the composition. In another aspect, the additive is added to whole stillage at a rate of about 5 ppm by weight to about 5000 ppm by weight, based on the weight of the composition. In another aspect, the additive is added to beer at a rate of about 5 ppm by weight to about 5000 ppm by weight, based on the weight of the composition.

In one aspect of the present disclosure, a method and composition for decreasing the amount of surfactant needed to recover coproducts from a product from a corn fermentation process stream, is provided. In general, using the surfactants and methods described in this disclosure results in a decrease in the amount of surfactant that is needed to enhance the yield of quality coproducts. In some aspects, the amount of surfactant needed is decreased by amounts, such as at least 5%, 10%, 15%, 20%, 25%, 30%, 35%, 40%, 45%, 50%, or more. Reductions in the amount of surfactants or of types of surfactants that are needed to obtain increased yields result in reduced costs.

The foregoing may be better understood by reference to the following examples, which are presented for purposes of illustration and are not intended to limit the scope of the invention in any way.

EXAMPLES

Unless noted otherwise, all concentrations refer to the active content of the surfactant. Corn syrups were collected from various corn ethanol plants and were designated #1, #2, etc.

Example 1

Materials and Methods

This example tests and compares the oil removal of conventional oil removal surfactant compositions and alkylphenol ethoxylate formaldehyde resins. The testing added 0.0325 g of surfactant and 65 g of #1 corn syrup to eight 150 ml beakers. The mixture was stirred and heated to 90° C. before being poured into centrifuge tubes and centrifuged at 850 rpm for 30 minutes. The amount of recovered oil was then recorded. Results are provided below in Table 1.

Results

TABLE 1

| Corn Syrup #1 | | |
|---|---|---|
| Surfactant | ppm (Active) of Demulsifier | Recovered Oil (ml) |
| Blank | 0 | 1 |
| Agnique ® CSO-36 | 500 | 10 |
| Agnique ® CSO-40 | 500 | 12 |
| Basorol ® P DB-9934 | 500 | 24 |
| Basorol ® P DB-9935 | 500 | 6 |
| Basorol ® G 3218 | 500 | 4 |
| Basorol ® 1135i | 500 | 1 |
| Basorol ® P DB-9955 | 350 | 15 |
| Basorol ® P-DB 9958 | 500 | 2 |

As can be seen, the alkylphenol ethoxylate formaldehyde resins (the Basorol® products) were able to remove a much greater volume of oil than when no surfactant was used and many were able to remove more than a nonionic surfactant (Agnique® products) alone. For example, Basorol® P DB 9934 removed twice as much oil as either of the Agnique® products.

Example 2

Materials and Methods

This example tests and compares the oil removal of conventional oil removal compositions and alkylphenol ethoxylate formaldehyde resins. The testing added the amount of compound shown below in Table 2 to 70 g of #2 corn syrup into eight 150 ml beakers. Basorol® P DB-9955 (BASF Corporation) is an ethoxylated amylphenol formaldehyde resin and Barsorol® P DB-9934 (BASF Corporation) is an ethoxylated nonylphenol formaldehyde resin. The mixture was stirred, heated to 90° C., and centrifuged at 850 rpm for 30 minutes. The amount of recovered oil was then recorded. Results are provided below in Table 2.

Results

TABLE 2

Corn Syrup #2

| Surfactant | Gram used (Active)/70 g syrup | Recovered Oil (g) |
| --- | --- | --- |
| Blank | 0 | 0.1304 |
| Basorol ® P-DB 9955 | 0.0245 | 1.31330 |
| Nonylphenol 9 EO | 0.0341 | 0.0512 |
| Octylphenol 10 EO | 0.0344 | 0.1184 |
| Hydrophobically Modified PEI | 0.0352 | 0.0762 |
| Basorol ® P DB-9934 | 0.0351 | 0.7865 |

As can be seen, the alkylphenol ethoxylate formaldehyde resins were able to remove a much greater amount of oil than any of the other products.

Example 3

Materials and Methods 55 ml of syrup #3 was weighed in a glass bottle, heated to 90° C., and combined with the desired amount of emulsion breaker(s). For the Agnique® CSO-36 (a non-ionic surfactant, I. e. ethoxylated castor oil) (BASF Corporation), 200 ppm of this emulsion breaker was included and the Disponil® SLS 2010 PR (lauryl alcohol sulfate) concentration varied from 0 to 300 ppm. For the Basorol® P DB-9955 a de-emulsifier (BASF Corporation), 35 ppm was included and the Disponil® SLS 2010 PR (BASF Corporation) concentration varied from 0 to 300 ppm. Then, the glass bottle was shaken, heated at 90° C., and centrifuged at 850 rpm for 30 minutes. After the centrifugation finished, the free oil was measured and recorded.

$$\text{The oil recovery (\%)} = \frac{\text{recovered oil vol/mass}}{\text{syrup vol/mass}} \times 100$$

Results

As shown in FIG. 1, the inclusion of an anionic surfactant greatly increased the yield of oil recovered in comparison to the emulsion breaker. For the Agnique® CSO-36, the yield was increased from a little over 1.5% to almost 12% when Disponil® SLS 2010 PR was included. For the Basorol® P DB-9955, the yield was increased from a little over 3% to about 11% when Disponil® SLS 2010 PR was included. Substantial increases in yield began to occur for both anionic additives when they were included at about 100 ppm and above.

Example 4

Materials and Methods 10 g of syrup #4 was added to a centrifuge tube, then heated to 90° C. before mixing in the desired amount of emulsion breaker(s) and centrifuging. The nonionic surfactants tested included Agnique® CSO-25 (BASF Corporation) and the anionic surfactants included Disponil® FES 32 (BASF Corporation), Disponil® FES 77 (BASF Corporation), Disponil® FES 993 (BASF Corporation), Disponil® SLS 2010 PR (BASF Corporation), or sodium dodecyl sulfate (SDS). Afterward, the amount of free oil was measured and recorded.

Results

As shown below in Table 3, the inclusion of an anionic surfactant with the nonionic surfactant increased the yield of oil recovered from the syrup.

TABLE 3

Emulsion Breaker

| Agnique ® CSO 25 (ppm) | Anionic surfactant (ppm) | oil recovered (wt. % relative to syrup mass) |
| --- | --- | --- |
| 500 | 0 | 1.514 |
| 300 | Disponil ® FES 32 (62) | 1.786 |
| 250 | Disponil ® FES 77 (80) | 1.943 |
| 250 | Disponil ® FES 993 (75) | 1.88 |
| 300 | Disponil ® SLS 2010 PR (60) | 2.069 |
| 400 | SDS (100) | 2.674 |

In general, anionic surfactants, such as, SDS or SLS, are cheaper than nonionic surfactants. Thus, not only does the inclusion of an anionic surfactant increase the yield of the corn oil, but using anionic surfactants can also reduce the overall cost of surfactants in treating the corn syrup. As shown in Table 3, all of the samples including an anionic surfactant reduced the amount of nonionic surfactant that was used.

Example 5

Materials and Methods 10 g of syrup #3 was added to a centrifuge tube, heated to 90° C., and combined with the desired amount of an alkylphenol ethoxylate formaldehyde resin emulsion breaker(s) and anionic surfactant. This mixture was then centrifuged and the amount of free oil was measured and recorded. Table 4 provides the formulations for the surfactants that were tested.

TABLE 4

| Emulsion breaker name | Anionic surfactant concentration (ppm) | DB9955 Concentration (ppm) |
| --- | --- | --- |
| Basorol ® P DB-9955 | 0 | 210 |
| Basorol ® P DB-9955/Disponil ®SLS2010 PR | 60 | 210 |
| Basorol ®P DB-9955/SDS | 100 | 210 |

Results

Figure 2:
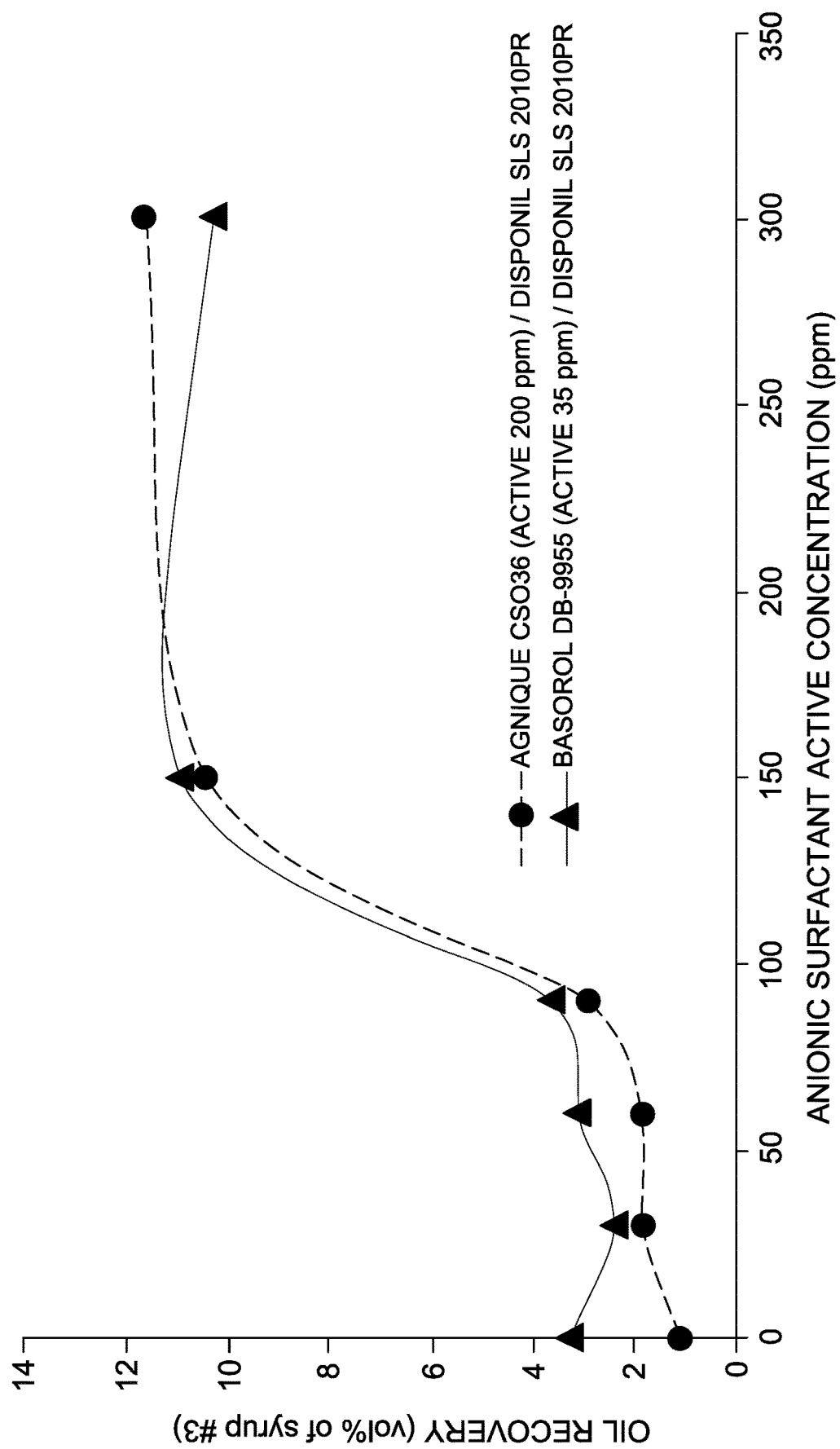
FIG. 2 is a graph illustrating the effects of the combination of nonionic-anionic surfactants on oil removal from corn syrup.
Figure 3:
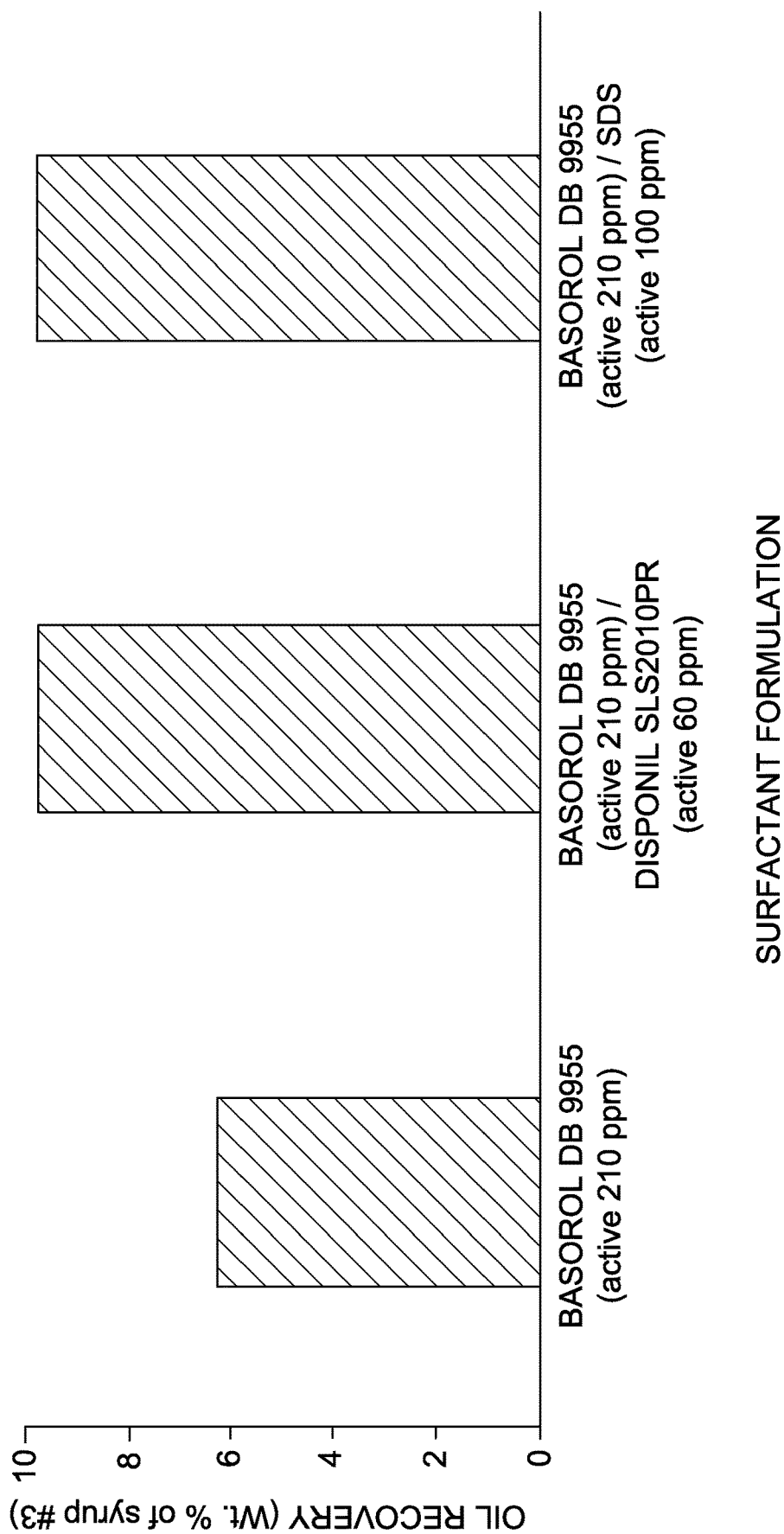
FIG. 3 is a graph illustrating the effect of the addition of an anionic surfactant to an alkylphenol ethoxylate formaldehyde resin on oil removal from corn syrup.

As shown in FIG. 2, the addition of the anionic surfactant to the alkylphenol ethoxylate formaldehyde resin emulsion breaker resulted in an increase of recovered oil.

Example 6

Materials and Methods 55 ml of syrup #4 was weighed, heated to 90° C., and combined with the desired amount of alkylphenol ethoxylate formaldehyde resin or non-ionic surfactant emulsion breaker(s) and anionic surfactant. This mixture was shaken, heated to 90° C., and centrifuged at 840 rpm for 8 minutes before the free oil was measured and recorded. Table 5 provides the formulations for the tested surfactant mixtures.

TABLE 5

| Emulsion breaker name | Non-ionic surfactant concentration (ppm) | Anionic surfactant concentration (ppm) |
|---|---|---|
| Basorol ® P DB-9955 | 210 | 0 |
| Basorol ® P DB-9955/Disponil ® SLS 2010 PR | 210 | 60 |
| Basorol ® P DB-9955/SDS | 210 | 100 |
| Agnique ® CSO-25 | 300 | 0 |
| Agnique ®CSO-25/Disponil ® SLS 2010 PR | 300 | 60 |
| Agnique ® CSO-25/SDS | 300 | 100 |
| Agnique ® CSO-36 | 300 | 0 |
| Agnique ® CSO-36/Disponil ® SLS 2010 PR | 300 | 60 |
| Agnique ® CSO-36/SDS | 300 | 100 |

Results

Figure 4:
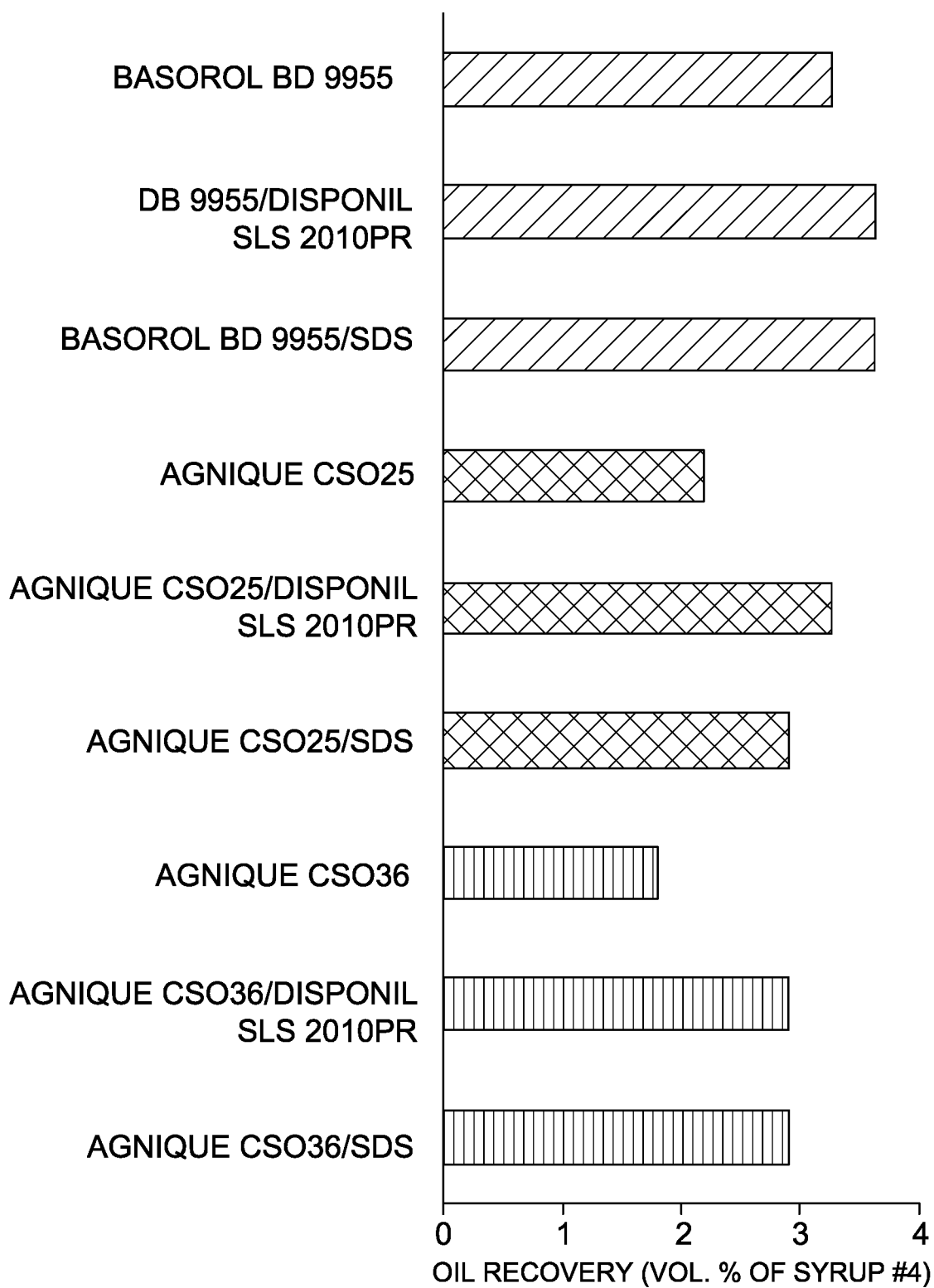
FIG. 4 is a graph illustrating and comparing the oil removal from Syrup 4 by different surfactants including an alkylphenol ethoxylated formaldehyde resin with and without an anionic surfactant and two different non-ionic surfactants with and without an anionic surfactant.

As shown in FIG. 4, the addition of the anionic surfactant to the nonionic surfactant emulsion breaker resulted in an increase of recovered oil compared to the alkylphenol ethoxylate formaldehyde resin (Basorol® P DB-9955) alone, or either of the non-ionic surfactants (Agnique® CSO-25 or Agnique® CSO-36) alone.

While the invention has been illustrated and described in detail in the drawings and the foregoing description, the same is to be considered as illustrative and not restrictive in character. It is apparent that numerous other forms and modifications will be obvious to those skilled in the art. The appended claims and this invention generally should be construed to cover all such obvious forms and modifications, which are within the true scope of the present invention.

What is claimed is:

1. A composition comprising a product from a corn fermentation process stream, wherein the product is selected from the group of beer, whole stillage, thin stillage, and corn syrup, and at least one additive comprising alkylphenol ethoxylate formaldehyde resins or sodium alkyl sulfate.

2. The composition of claim 1, wherein the alkylphenol ethoxylate formaldehyde resin is selected from the group consisting of a butylphenol ethoxylate formaldehyde resin, an amylphenol ethoxylate formaldehyde resin, an octylphenol ethoxylate formaldehyde resin, and a nonylphenol ethoxylate formaldehyde resin.

3. The composition of claim 1, wherein the sodium alkyl sulfate is sodium octyl sulfate or sodium lauryl sulfate.

4. The composition of claim 1, further comprising a component selected from the group of surfactants, hydrophobic silica particles, hydrophilic silica particles, and any combination thereof.

5. The composition of claim 4, wherein the component comprises at least one surfactant selected from the group of anionic surfactants, nonionic surfactants, and any combination thereof.

6. The composition of claim 5, wherein the component comprises at least one anionic surfactant.

7. The composition of claim 1, wherein the additive is present in an amount of between 5 to 5000 ppm by weight, based on the weight of the composition.

8. A composition comprising a product from a corn fermentation process stream and an additive, wherein the additive comprises a blend of at least one anionic surfactant and at least one nonionic surfactant, wherein the at least one nonionic surfactant comprises an alkylphenol ethoxylate formaldehyde resin, and wherein the weight ratio of the at least one nonionic surfactant to the at least one anionic surfactant is in a range from about 1:20 to about 20:1.

9. The composition of claim 8, wherein the product from a corn fermentation process stream is selected from the group of beer, whole stillage, thin stillage, and corn syrup.

10. The composition of claim 8, wherein the at least one anionic surfactant is selected from the group of alkylbenzene sulfonates, alkylphenol ether sulfates, alkyl sulfates, carboxylates, napthalene sulfonates, olefin sulfonates, petroleum sulfonates, phosphates, phospholipid, soap, soap substitute, sulfates, ethoxylated sulfates, sulfonates, and any combination thereof.

11. The composition of claim 8, wherein the at least one nonionic surfactant comprises an alkylphenol ethoxylate formaldehyde resin selected from the group consisting of a butylphenol ethoxylate formaldehyde resin, an amylphenol ethoxylate formaldehyde resin, an octylphenol ethoxylate formaldehyde resin, and a nonylphenol ethoxylate formaldehyde resin.

12. The composition of claim 11, wherein the alkylphenol ethoxylate formaldehyde resin is an amylphenol ethoxylate formaldehyde resin or a nonylphenol ethoxylate formaldehyde resin.

13. The composition of claim 8, wherein the additive is present in an amount between about 5 to about 5000 ppm by weight, based on the weight of the composition.

14. The composition of claim 8, further comprising silica particles.

* * * * *